(12) United States Patent
Idomoto et al.

(10) Patent No.: US 7,909,362 B2
(45) Date of Patent: Mar. 22, 2011

(54) MANUFACTURING METHOD OF AIRBAG CUSHION, AND THE AIRBAG CUSHION

(75) Inventors: Takeshi Idomoto, Yokohama (JP); Hiroya Tabushi, Yokohama (JP)

(73) Assignee: Autoliv Development AB, Vargarda (SE)

( * ) Notice: Subject to any disclaimer, the term of this patent is extended or adjusted under 35 U.S.C. 154(b) by 202 days.

(21) Appl. No.: 12/441,455

(22) PCT Filed: Sep. 11, 2007

(86) PCT No.: PCT/JP2007/067647
§ 371 (c)(1),
(2), (4) Date: Mar. 16, 2009

(87) PCT Pub. No.: WO2008/035589
PCT Pub. Date: Mar. 27, 2008

(65) Prior Publication Data
US 2010/0013204 A1    Jan. 21, 2010

(30) Foreign Application Priority Data
Sep. 22, 2006    (JP) .................... 2006-257787

(51) Int. Cl.
*B60R 21/16* (2006.01)
(52) U.S. Cl. .................... 280/743.1; 280/743.2
(58) Field of Classification Search ........... 280/743.1, 280/743.2
See application file for complete search history.

(56) References Cited

U.S. PATENT DOCUMENTS

| | | | | |
|---|---|---|---|---|
| 7,380,822 B2 * | 6/2008 | Abe | ............ | 280/743.1 |
| 7,455,317 B2 * | 11/2008 | Bito | ............ | 280/732 |
| 7,458,605 B2 * | 12/2008 | Hasebe et al. | ............ | 280/729 |
| 7,461,862 B2 * | 12/2008 | Hasebe et al. | ............ | 280/743.2 |
| 7,631,894 B2 * | 12/2009 | Hasebe et al. | ............ | 280/743.2 |
| 7,841,622 B2 * | 11/2010 | Pausch et al. | ............ | 280/743.2 |
| 2003/0218325 A1 | 11/2003 | Hasebe et al. | | |
| 2004/0164526 A1 * | 8/2004 | Hasebe et al. | ............ | 280/729 |
| 2004/0195807 A1 | 10/2004 | Hasebe et al. | | |
| 2005/0161918 A1 | 7/2005 | Bito | | |
| 2006/0028009 A1 | 2/2006 | Hasebe et al. | | |
| 2006/0103118 A1 | 5/2006 | Hasebe | | |
| 2006/0237953 A1 * | 10/2006 | Abe | ............ | 280/729 |
| 2006/0249934 A1 | 11/2006 | Hasebe | | |
| 2007/0018438 A1 * | 1/2007 | Hasebe et al. | ............ | 280/729 |
| 2009/0020991 A1 * | 1/2009 | Abe et al. | ............ | 280/739 |
| 2009/0302587 A1 * | 12/2009 | Thomas | ............ | 280/743.2 |

FOREIGN PATENT DOCUMENTS

CN    1459394 A    12/2003
(Continued)

*Primary Examiner* — Toan C To
(74) *Attorney, Agent, or Firm* — Harness, Dickey & Pierce, P.L.C.

(57) ABSTRACT

An airbag cushion is manufactured with a rear fabric panel and two front fabric panels. Each front fabric panel has a projecting tether portion to be sewn to an inner face of the rear fabric panel. The front fabric panels are, firstly, superimposed each other. A back end of the projecting tether portion is sewn to a part of a periphery of the front fabric panel, to form a second stitch portion in a recessed shape. A front end of the tether portion is then sewn to the inner face of the rear fabric panel. A periphery of the rear fabric panel is, in addition, sewn to a periphery of the front fabric panel corresponding to the periphery of the rear fabric panel, to form a third stitch portion.

20 Claims, 16 Drawing Sheets

FOREIGN PATENT DOCUMENTS

| | | |
|---|---|---|
| EP | 1364838 A2 | 11/2003 |
| EP | 1452403 A1 | 9/2004 |
| EP | 1632405 A1 | 3/2006 |
| JP | 2004-244005 | 9/2004 |
| JP | 2004-314933 A | 11/2004 |
| JP | 2005-212508 A | 8/2005 |
| JP | 2006-76561 A | 3/2006 |
| JP | 2007-153290 A | 6/2007 |

\* cited by examiner

MANUFACTURING METHOD OF AIRBAG CUSHION, AND THE AIRBAG CUSHION

This application is the national phase under 35 U.S.C. §371 of PCT International Application No. PCT/JP2007/067647 which has an International filing date of Sep. 11, 2007 and designated the United States of America.

BACKGROUND OF THE INVENTION

1. Field of the Invention

The present invention relates to a manufacturing method of an airbag cushion including a rear fabric panel and two front fabric panels, and to the airbag cushion thereby manufactured.

2. Description of Related Art

An airbag system is well known to be equipped for cars. When detecting an impact of car crash, the airbag system can injects gas generated by an inflator (gas generator) into an airbag cushion. Then, the generated gas inflates and deploys the airbag cushion. Thus, the airbag cushion can absorb the impact of the car crash to protect an occupant of the car, by interposing between the occupant and the car body. Furthermore, the airbag cushion is known to be equipped for a steering wheel or an instrumental panel on an assistant driver side to protect the face and the upper body of the occupants, for securing higher level safety.

Japanese Patent Application Laid-Open No. 2004-244005 discloses a technique of inflating and deploying an airbag cushion into a specific shape, to improve the safety level. The airbag cushion described therein includes a right-side section and a left-side section. In a deployed state, the right-side and left-side sections catch hard costae of right-side and left-side chests of the occupant, respectively. In addition, the airbag cushion described therein includes a cavity between the right-side section and the left-side section. In the deployed state, the cavity catches the sternums located at the center of the chest to absorb the impact.

SUMMARY OF THE INVENTION

The airbag cushion according to Japanese Patent Application Laid-Open No. 2004-244005 requires, however, a large capacity to to be enclosed, because the airbag cushion should be formed with six fabric panels including two front inner fabric panels, two front outer fabric panels, one rear inner fabric panel and one rear outer fabric panel. Furthermore, the airbag cushion according to Japanese Patent Application Laid-Open No. 2004-244005 needs much effort for sewing those fabric panels.

Moreover, the airbag cushion according to Japanese Patent Application Laid-Open No. 2004-244005 includes strings attached respectively to the front inner fabric panels and strings attached respectively to the front outer fabric panels, to prevent a left side face of the right-side section from moving away from a right side face of the right-side section, and to prevent a left side face of the left-side section from moving away from a right side face of the left-side section, beyond a predetermined distance. Therefore, the airbag cushion according to Japanese Patent Application Laid-Open No. 2004-244005 needs further effort for the manufacture.

The present invention has been accomplished in view of the foregoing situations, with an object to provide an airbag cushion and a manufacturing method of the airbag cushion that save the number of fabric panels and have a simpler sewing processing, with a rear fabric panel and two front panels protruding tether portions respectively, wherein each tether portion are sewn to an inner face of the rear fabric panel, by sewing a back end of each tether portion and parts of peripheries of two front fabric panels in a recessed shape. Furthermore, the object includes a provision of such airbag cushion and such manufacturing method of the airbag cushion that can properly protect a head and a chest of an occupant by the configuration of recessed shape.

In accordance with an aspect of the present invention, a manufacturing method of an airbag cushion having a rear fabric panel and at least two front fabric panels, comprises steps of: superimposing the two front fabric panels each other, each of the front fabric panels protrudes a tether portion to be sewn to an inner face of the rear fabric panel; sewing on a back end of the protruded tether portion and on parts of peripheries of the front fabric panels, in a recessed shape; sewing a front end of the tether portion to the inner face of the rear fabric panel; and sewing a periphery of the rear fabric panel to peripheries of the front fabric panels corresponding to the periphery of the rear fabric panel.

In a manufacturing method of an airbag cushion in accordance with an aspect of the present invention, the tether portion is configured from a part of the front fabric panel.

In a manufacturing method of an airbag cushion in accordance with an aspect of the present invention, one end of each the front fabric panels is cut in advance.

In a manufacturing method of an airbag cushion in accordance with an aspect of the present invention, a depth of the recessed shape is changed when sewing on the back end of the tether portion and on the parts of peripheries of the front fabric panels in a recessed shape.

In accordance with an aspect of the present invention, a manufacturing method of an airbag cushion having a rear fabric panel and at least two front fabric panels, comprises steps of: superimposing the two front fabric panels each other; sewing parts of the front fabric panels to tether portions that are sewn to an inner face of the rear fabric panel; sewing on parts of peripheries of the front fabric panels in a recessed shape; sewing front ends of the tether portions to the inner face of the rear fabric panel; and sewing a periphery of the rear fabric panel to peripheries of the front fabric panels corresponding to the periphery of the rear fabric panel.

In accordance with an aspect of the present invention, a manufacturing method of an airbag cushion having a rear fabric panel and at least two front fabric panels, comprises steps of: superimposing the front fabric panels each other; superimposing parts of the front fabric panels on back ends of tether portions that are sewn to an inner face of the rear fabric panel; sewing on parts of peripheries of the front fabric panels and on the back ends of the tether portions, in a recessed shape; sewing front ends of the tether portions to the inner face of the rear fabric panel; and sewing a periphery of the rear fabric panel and peripheries of the front fabric panels corresponding to the periphery of the rear fabric panel.

In accordance with an aspect of the present invention, a manufacturing method of an airbag cushion having a rear fabric panel and a front fabric panel, comprises steps of: folding the front fabric panel to superimposing the front fabric panel; sewing on a part of the superimposed front fabric panel in a recessed shape; sewing an end of the front fabric panel to a back end of tether portion that is sewn to an inner face of the rear fabric panel; sewing a front end of the tether portion to the inner face of the rear fabric panel; and sewing a periphery of the rear fabric panel and peripheries of the front fabric panels corresponding to the periphery of the rear fabric panel.

In a manufacturing method of an airbag cushion in accordance with an aspect of the present invention, a depth of the recessed shape is changed when sewing on a part of periphery of the front fabric panel in a recessed shape.

In accordance with an aspect of the present invention, an airbag cushion sewn a rear fabric panel and at least two front fabric panels, comprises: a peripheral stitch portion where a periphery of the rear fabric panel and each periphery of the front fabric panels corresponding to the periphery of the rear fabric panel are sewn; a recessed stitch portion where the front fabric panels are sewn together in a recessed shape; and a tether portion that projects from the recessed stitch portion or a vicinity of the recessed stitch portion, wherein the tether portion is sewn to an inner face of the rear fabric panel.

In an airbag cushion in accordance with an aspect of the present invention, the tether portion is configured from a part of the front fabric panel, projects from the recessed stitch portion, and is sewn to the inner face of the rear fabric panel; and parts of peripheries of the front fabric panels and a back end of the tether portion are sewn in a recessed shape at the recessed stitch portion.

In an airbag cushion in accordance with an aspect of the present invention, the tether portion is a separate structure from the pair of front fabric panels, projects from the recessed stitch portion or a vicinity of the recessed stitch portion, and is sewn to the inner face of the rear fabric panel; and parts of peripheries of the front fabric panels and a back end of the tether portion are sewn in a recessed shape at the recessed stitch portion.

In an airbag cushion in accordance with an aspect of the present invention, parts of peripheries of the front fabric panels with the exception of the peripheral stitch portion and a back end of the tether portion are sewn in a recessed shape at the recessed stitch portion.

In accordance with an aspect of the present invention, an airbag cushion sewn a rear fabric panel and at least two front fabric panels, comprises: a peripheral stitch portion where a periphery of the rear fabric panel and each periphery of the front fabric panels corresponding to the periphery of the rear fabric panel are sewn; a recessed stitch portion where the pair of front fabric panels are sewn together in a recessed shape; and a tether portion whose back end is sewn to each of the front fabric panels and whose front end is sewn to an inner face of the rear fabric panel.

In accordance with an aspect of the present invention, an airbag cushion sewn a rear fabric panel and a front fabric panel, comprises: a recessed stitch portion where the front fabric panel being folded is sewn in a recessed shape; a peripheral stitch portion where a periphery of the rear fabric panel and a periphery of the front fabric panel corresponding to the periphery of the rear fabric panel are sewn; and a tether portion whose back end is sewn to an end of the front fabric panel and whose front end is sewn to an inner face of the rear fabric panel.

According to the present invention, the airbag cushion includes a rear fabric panel and at least two front fabric panels. Firstly, the recessed stitch portion is formed by superimposing the front fabric panels each other, each of the front fabric panels protrudes a tether portion to be sewn to an inner face of the rear fabric panel, and by sewing on a back end of the protruded tether portion and on a part of a periphery of the front fabric panels, in a recessed shape. The front end of the tether portion is then sewn to the inner face of the rear fabric panel. In addition, the peripheral stitch portion is formed by sewing a periphery of the rear fabric panel to peripheries of the front fabric panels corresponding to the periphery of the rear fabric panel. Therefore, it is possible to prevent the rear fabric panel from being deployed beyond a predetermined width, because of the tether portion projecting from the pair of the front fabric panels and being sewn to the inner face of the rear fabric panel.

Furthermore, it is possible to properly protect the head or the sternum of the occupant with the use of a space defined by the recessed stitch portion, because the back end portion of the projecting tether portion and a part of the periphery of the front fabric panels are sewn in a recessed shape by the recessed stitch portion. Moreover, it is possible to properly protect the shoulder and the costae of the occupant because of the front fabric panels that is properly inflated and deployed in the left and right direction respectively.

According to the present invention, the airbag cushion includes a rear fabric panel and a front fabric panel. Firstly, the front fabric panel is folded to superimpose, and then the front fabric panel being folded is sewn in a recessed shape. The end of the front fabric panel is sewn to the back end of the tether portion. The front end of the tether portion is then sewn to the inner face of the rear fabric panel. In addition, a periphery of the rear fabric panel is sewn to a periphery of the front fabric panel corresponding to the periphery of the rear fabric panel.

According to the present invention, it is possible to prevent the rear fabric panel from being inflated and deployed beyond a predetermined width, because of the tether portion projecting from the pair of the front fabric panels. Furthermore, it is possible to properly protect the head or the sternum of the occupant with the use of a space of the recessed stitch portion, because the back end portion of the projecting tether portion and parts of the peripheries of the front fabric panels are sewn in a recessed shape by the recessed stitch portion. Moreover, it is possible to properly protect the shoulder and the costae of the occupant because of the front fabric panels that are properly inflated and deployed in the left and right direction respectively. In addition, it is possible to improve manufacturing efficiency because of saving the number of panels and sewing processes. It is further possible to save the capacity for installing the airbag cushion.

According to the present invention, it is possible to improve manufacturing efficiency and to save the capacity for installing the airbag cushion and the like, because of the configuration with one rear fabric panel, one front fabric panel and a tether portion to prevent extra-inflation. Thus, the present invention provides further advantages as described above.

1 Instrumental Panel
2 Airbag Cushion Case
3 Inflator
4 Front Glass
10 Front Fabric Panel
11 Tether Portion
12 Intermediate Portion
13 Head Portion
14 First Guide Mark
15 Second Guide Mark
16 Third Guide Mark
160 Back end
20 Front Fabric Panel
30 Rear Fabric Panel
31L Left Rear Portion
31R Right Rear Portion
32 Inflator Connection Portion
33 Inflator Inlet
34 Fourth Guide Mark
133 Arc-Shaped Peripheral Portion
134 L-Shaped Peripheral Portion
141 First Stitch Portion
151 Second Stitch Portion (Recessed Stitch Portion)
161 Third Stitch Portion (Peripheral Stitch Portion)
341 Fourth Stitch Portion

DESCRIPTION OF THE PREFERRED EMBODIMENTS

First Embodiment

Figure 1:
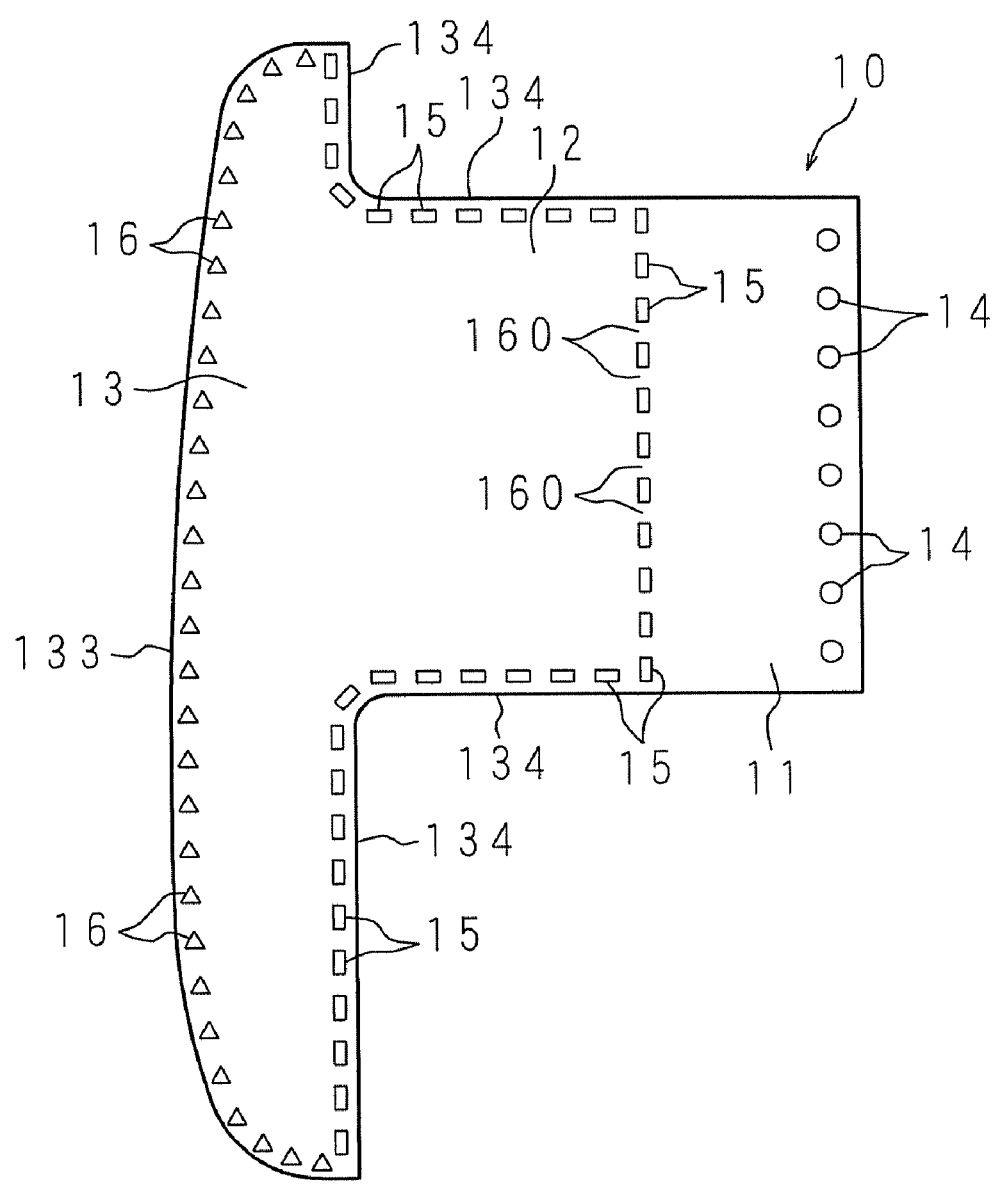
FIG. 1 is a plan view showing a shape of a front fabric panel.
Figure 3:
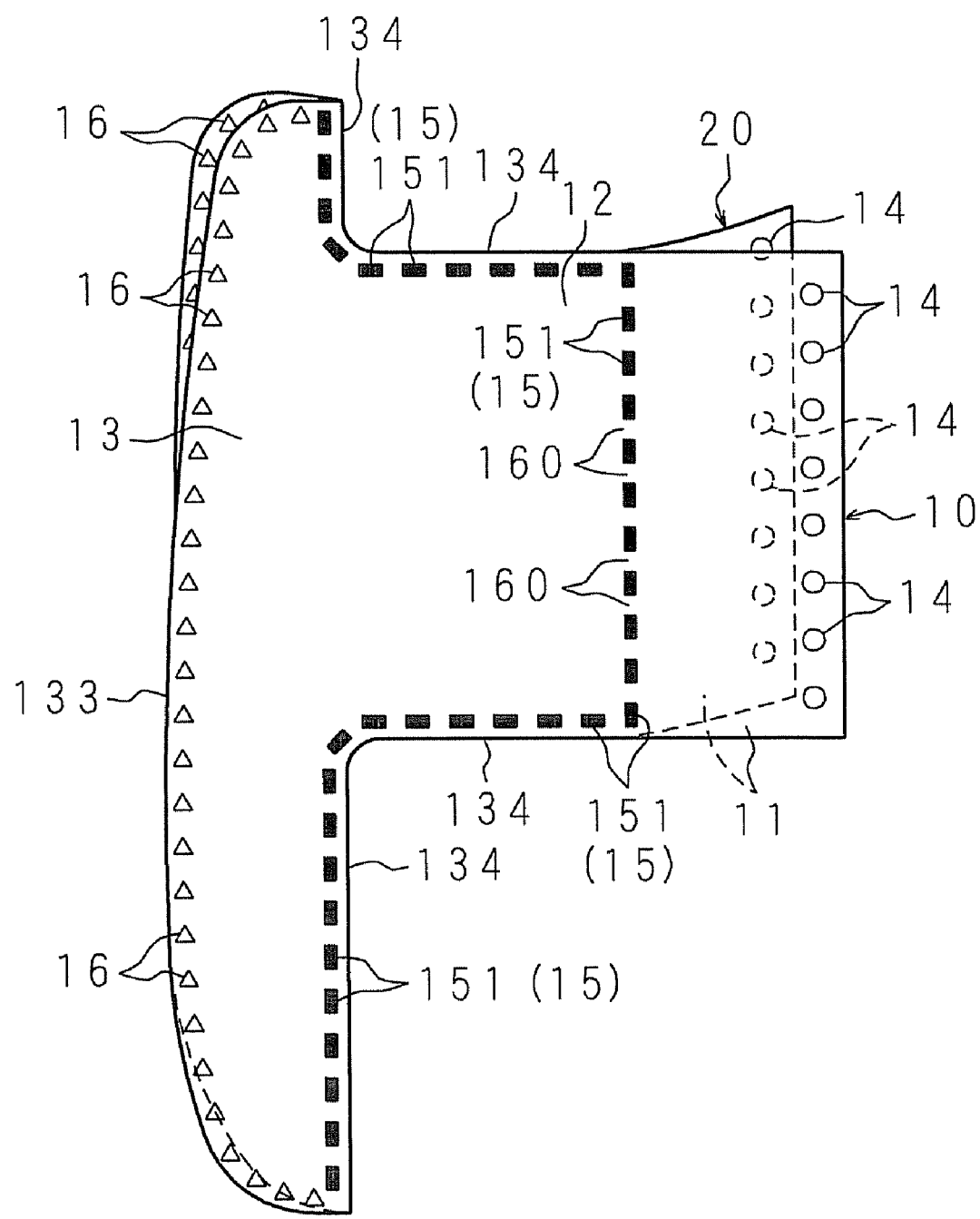
FIG. 3 is a plan view showing a state where two front fabric panels are sewn together.

Hereunder, embodiments of the present invention will be described referring to the drawings. An airbag cushion according to the present invention is manufactured with two front fabric panels and a rear fabric panel. FIG. 1 is a plan view showing a shape of the front fabric panel. In FIG. 1, a numeral 10 designates the front fabric panel. The front fabric panel 10 is made from a cloth woven with a nylon fiber, and is cut to make the plan view of the front fabric panel into an ocarina-like shape. The front fabric panel 10 is configured with a head portion 13 that is a substantial semi-elliptic shape, a tether portion 11 that is projecting in an opposite direction to the head portion 13, and an intermediate portion 12 that is a rectangular shape to join the head portion 13 and the tether portion 11. The front fabric panel 10 is formed in a similar shape to the other front fabric panel 20 (Ref. FIG. 3).

The tether portion 11 is a rectangular shape. Further, the tether portion 11 is longitudinally printed, at the side, first guide marks 14, 14, ... that are indicated by void circles. As it will be described later, a longer side of the tether portion 11 is sewn to an inner face of the rear fabric panel, to prevent the rear fabric panel from moving away from the front fabric panel 10 beyond a predetermined distance when the airbag cushion is inflated and deployed. The first guide marks 14, 14, ... are used to sew the tether portion to the inner face of the rear fabric panel in a proper alignment. Further, the tether portion 11 has a back end 160 that is linear, at another side opposite to the side printed the first guide marks 14, 14, .... As it will be described later, second guide marks 15, 15, ... are printed on the back end 160. It should be noted that this embodiment is explained with the printed first guide marks 14, 14, ... for ease of illustration. Thus, first guide marks 14, 14, ... may not be printed for visualization. Also, it should be noted that the tether portion 11 may be another suitable shape, although this embodiment is explained with the tether portion 11 of a rectangular shape. For example, the tether portion 11 may be such a trapezoidal shape that the side printed with the first guide marks 14, 14, ... is shorter than the opposite side formed with the back end 160.

The intermediate portion 12 is a rectangular shape, and is joined to the back end 160 of the tether portion 11 at the side and to the head portion 13 at other side opposite to the back end 160. The joining of intermediate portion 12 to the head portion 13 is at upper position than a center position of the substantial semi-elliptic-shaped head portion 13. The periphery of the head portion 13 and the intermediate portion 12 is configured from an arc-shaped peripheral portion 133 that is sewn to a periphery of the rear fabric panel and substantial L-shaped peripheral portions 134, 134 where the front fabric panel 10 is sewn to the front fabric panel 20.

The front fabric panel 10 has the second guide marks 15, 15, ... printed along the L-shaped peripheral portions 134, 134, and the linear back end 160, while the second guide marks 15, 15, ... are used to sew the front fabric panel 10 to the front fabric panel 20 in a proper alignment. Each of the second guide marks 15, 15, ... , indicated by a panel rectangle, is a recessed shape in the plan view. A recessed direction of the each second guide mark 15 is the same as a projecting direction of the tether portion 11. Furthermore, the front fabric panel 10 has third guide marks 16, 16, ... , which are indicated by void triangles, printed along the arc-shaped peripheral portion 133 of the head portion 13.

The third guide marks 16, 16, ... are used to sew the rear fabric panel to the arc-shaped peripheral portion 133 of the front fabric panel 10 in a proper alignment, while being different from the second guide marks 15, 15, ... that are used to sew the front fabric panel 10 to the front fabric panel 20 in a proper alignment.

Figure 2:
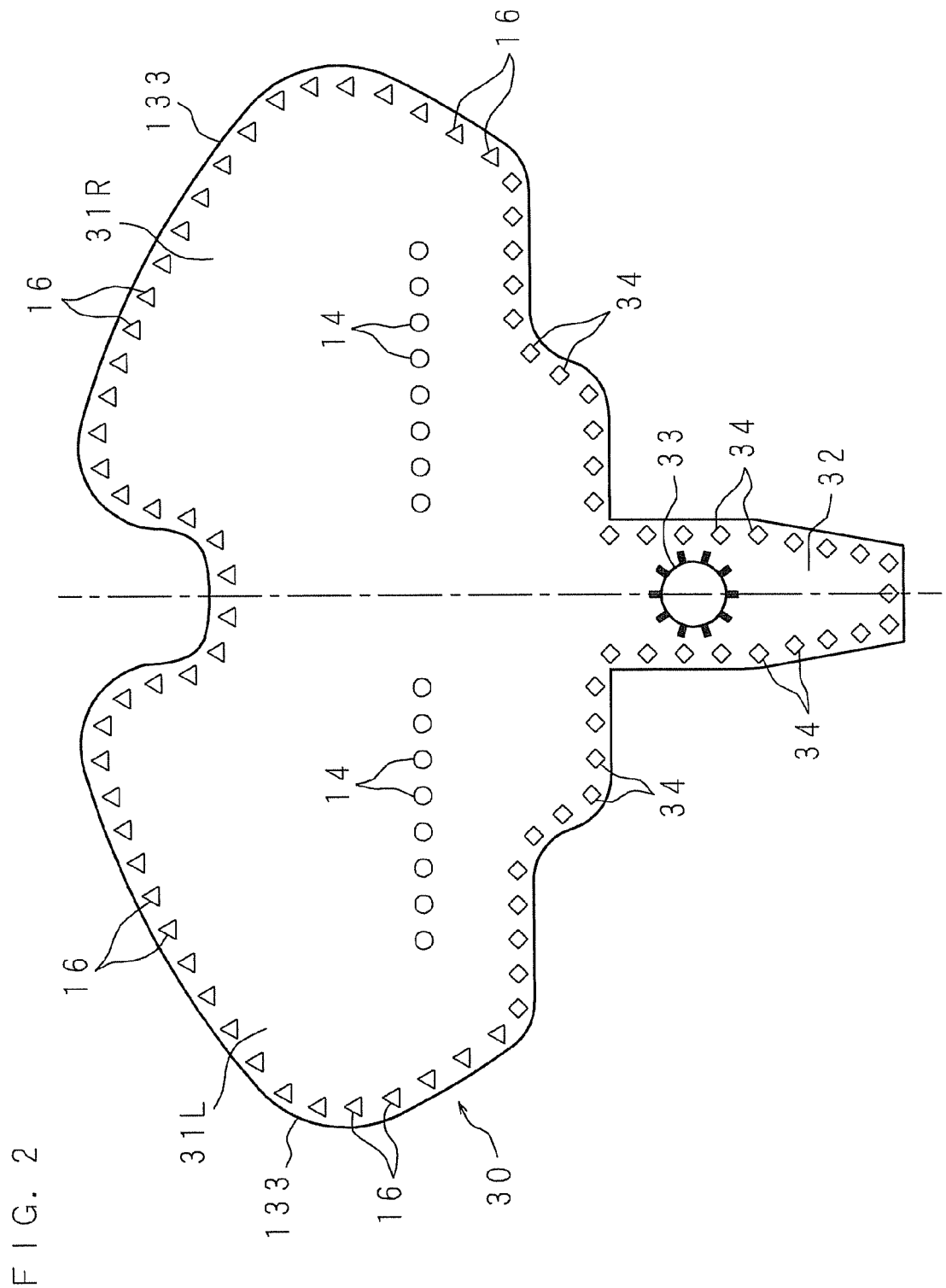
FIG. 2 is a plan view showing a shape of a rear fabric panel.

FIG. 2 is a plan view showing a shape of the rear fabric panel. In FIG. 2, a numeral 30 designates the rear fabric panel whose silhouette looks like an elephant with the ears, the nose, and the head. The rear fabric panel 30 is made from a cloth woven with a nylon fiber, as well as the front fabric panel 10. While having a folding line indicated by dash-dot lines at the center, the rear fabric panel 30 includes a left rear portion 31L and a right rear portion 31R. In addition, the rear fabric panel 30 includes an inflator connection portion 32 projecting downward along the folding line, and is symmetrical with respect to the folding line. The inflator connection portion 32 has an inflator inlet 33 at the upper center. The inflator inlet 33 is formed in a circular shape by cutting. Through the inflator inlet 33, gas from a gas generator (not shown) is injected into the airbag cushion when the airbag cushion is deployed.

The rear fabric panel 30 has fourth guide marks 34, 34, ... , which are indicated by void diamond shapes, printed along a periphery of the inflator connection portion 32 and lower peripheries of the left rear portion 31L and the right rear portion 31R. The fourth guide marks 34, 34, ... are used to sew one longitudinal side of the inflator connection portion 32 to the lower periphery of the left rear portion 31L and the other longitudinal side of the inflator connection portion 32 to the lower periphery of the right rear portion 31R, in a proper alignment. The fourth guide marks 34, 34, . . . for the one longitudinal side of the inflator connection portion 32 is printed symmetrically with respect to other fourth guide marks 34, 34, . . . for the other longitudinal side of the inflator connection portion 32.

An arc-shaped peripheral portion 133 of the left rear portion 31L corresponds to the arc-shaped peripheral portion 133 of the front fabric panel 10. The left rear portion 31L has the third guide marks 16, 16, . . . , which are indicated by void triangles, printed along the peripheral portion with exception of the portion where the fourth guide marks 34, 34, . . . are printed. Further, the left rear portion 31L has the first guide marks 14, 14, . . . , which are indicated by the void circles, printed at the substantial center in an orthogonal direction to the folding line. The first guide marks 14, 14, . . . on the inner face of the left rear portion 31L correspond to the first guide marks 14, 14, . . . printed along one side (front end) of the projecting tether portion 11 from the front fabric panel 10, as shown in FIG. 1. The right rear portion 31R has the first guide marks 14, 14, . . . , the third guide marks 16, 16, . . . and the fourth guide marks 34, 34, . . . that are printed at the symmetrical positions with those on the left rear portion 31L, respectively. It should be noted that this embodiment is explained with the first guide marks 14, 14, . . . , the second guide marks 15, 15, . . . , the third guide marks 16, 16, . . . , and the fourth guide marks 34, 34, . . . printed on the front fabric panels 10, 20 or the rear fabric panel 30, for ease of illustration. As described above, first guide marks 14, 14, . . . , second guide marks 15, 15, . . . , third guide marks 16, 16, . . . , and fourth guide marks 34, 34, . . . may not be printed for visualization.

It will be described about the processing to manufacture the airbag cushion with the two front fabric panels 10, 20 and the rear fabric panel 30. Firstly, a processing will be described to sew together the front fabric panels 10, 20. FIG. 3 is a plan view showing a state where the two front fabric panels 10, 20 are sewn together. The front fabric panel 10 is superimposed on the front fabric panel 20 to keep the conformity in positions of the peripheral portions, as the front fabric panel 10 is substantially the same shape as the front fabric panel 20. The front fabric panel 10 and the front fabric panel 20 are then sewn together along the second guide marks 15, 15, . . . , to form second stitch portions (recessed stitch portion) 151, 151, . . . in a recessed shape which are indicated by solid rectangles. The second stitch portions 151, 151, . . . are formed along the L-shaped peripheral portions 134, 134, and the linear back end 160, as well as the second guide marks 15, 15, . . . , to make a recessed shape. Therefore, a space is formed in a recessed shape by sewing together the front fabric panel 10 and the front fabric panel 20. It is possible for the space to catch the head or sternum of the occupant when the airbag cushion is inflated and deployed.

Figure 4:
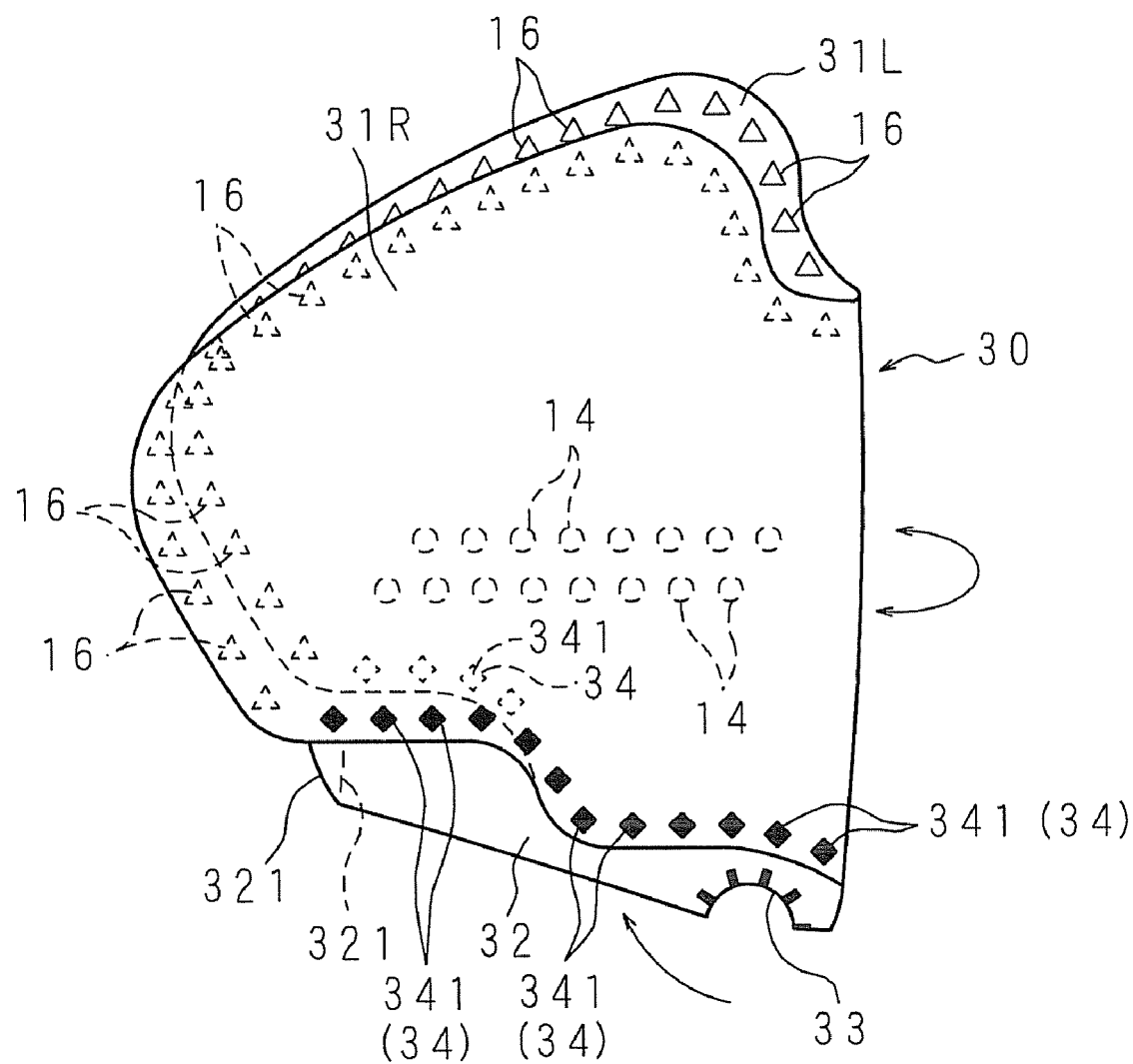
FIG. 4 is a schematic perspective view showing the rear fabric panel folded along a folding line.

Next, another processing will be described to sew the rear fabric panel 30. FIG. 4 is a schematic perspective view showing the rear fabric panel 30 folded along the folding line. The rear fabric panel 30 shown in FIG. 2 is folded along the folding line in a direction from the sheet face toward the viewer about the folding line, to superimpose the right rear portion 31R on the left rear portion 31L. The inflator connection portion 32 and the inflator inlet 33 are also folded in the same direction (from the sheet face toward the viewer) along the folding line. As the inflator connection portion 32 is folded in a direction indicated by an arrow, the fourth guide marks 34, 34, . . . at one of the longitudinal sides of the inflator connection portion 32 are superimposed on the fourth guide marks 34, 34, . . . on the right panel 31R to sew together. Thus, fourth stitch portions 341, 341, . . . are formed, which are indicated by solid diamond shapes, by sewing the fourth guide marks 34, 34, . . . of the inflator connection portion 32 and the right panel 31R. The inflator connection portion 32 is then sewn up the areas 321, 321 of the shorter front end. Therefore, in a side view of the rear fabric panel 30, the inflator inlet 33 is arranged in a semicircular shape at a bottom of the rear fabric panel 30 and is opened toward outside of the rear fabric panel 30.

Figure 5:
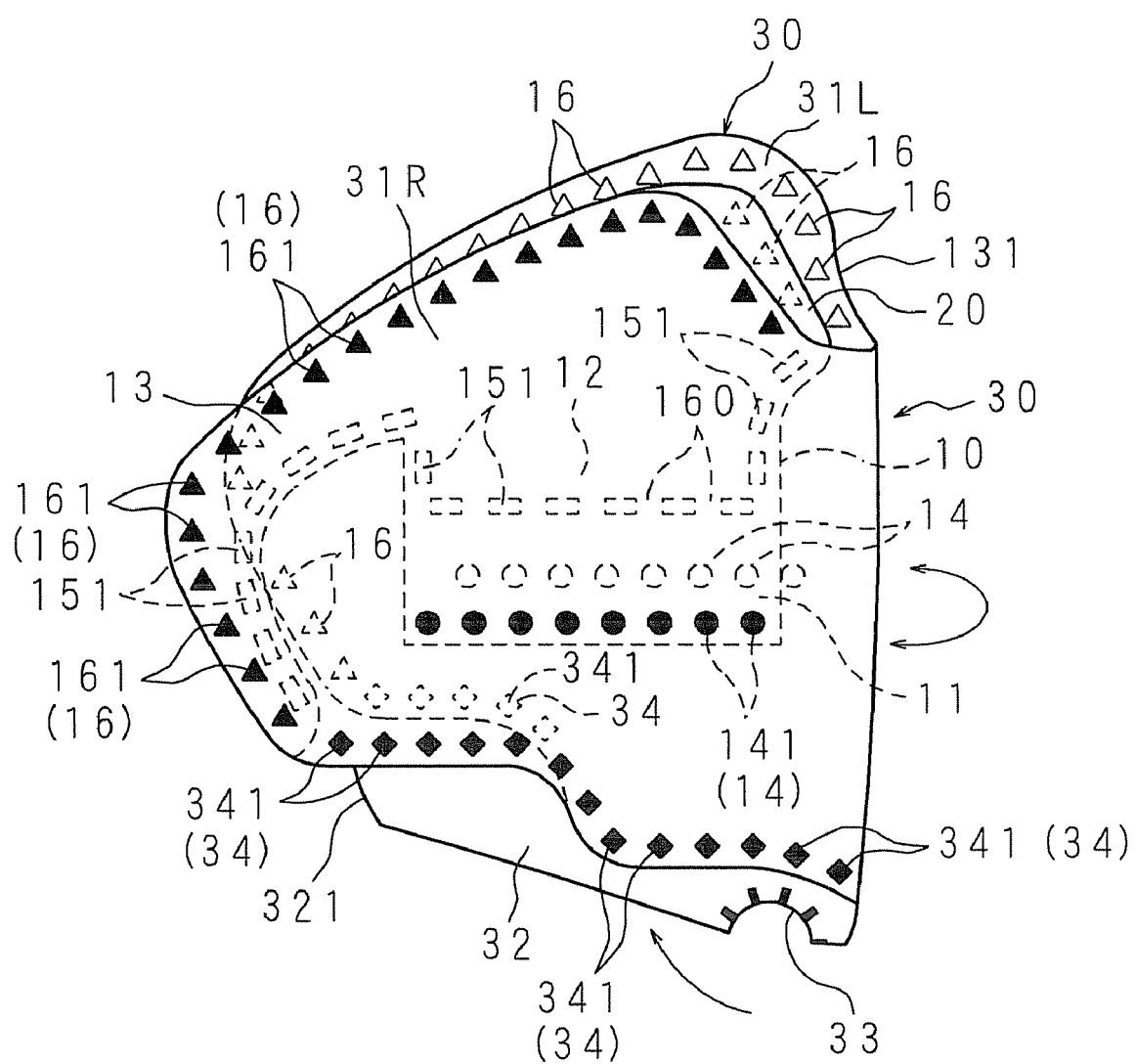
FIG. 5 is a schematic perspective view showing the right rear fabric panel sewn with the front fabric panel.

Finally, another processing will be described to sew the two front fabric panels 10, 20 and the rear fabric panel 30. FIG. 5 is a schematic perspective view showing the right rear portion 31R sewn to the front fabric panel 10. The front fabric panel 10 and the front fabric panel 20 are inserted from the tether portion 11 into the inwardly folded rear fabric panel 30, while the second stitch portions 151, 151, . . . keep the front fabric panel 10 and the front fabric panel 20 to be sewn. The first guide marks 14, 14, . . . along one side of the tether portion 11 projecting from the front fabric panel 10 are superimposed on the first guide marks 14, 14, . . . printed on the inner face of the right rear portion 31R, to sew up together. Thus, first stitch portions 141, 141, . . . are formed, which are indicated by solid circles, by sewing the first guide marks 14, 14, . . . of the tether portion 11 and the right panel 31R. Therefore, it is possible for the first stitch portions 141, 141, . . . to prevent the front fabric panel 10 from moving away from the right panel 31R beyond a predetermined width.

Next, the front fabric panel 10 is folded to conform the own arc-shaped peripheral portion 133 to the arc-shaped peripheral portion 133 of the right rear portion 31R. The third guide marks 16, 16, . . . of the front fabric panel 10 are then superimposed on the third guide marks 16, 16, . . . of the right rear portion 31R, to sew up together. Thus, third stitch portions (peripheral stitch portions) 161, 161, . . . are formed, which are indicated by solid triangles, by sewing the third guide marks 16, 16, . . . of the front fabric panel 10 and the right panel 31R. In the similar manner, the first guide marks 14, 14, . . . of the front fabric panel 20 are superimposed on the first guide marks 14, 14, . . . of the left rear portion 31L, to sew up together. Thus, other first stitch portions 141, 141, . . . (not shown) are formed by sewing the first guide marks 14, 14, . . . of the front fabric panel 20 and the left rear portion 31L. Further, the third guide marks 16, 16, . . . printed on the front fabric panel 20 are then superimposed on the third guide marks 16, 16, . . . printed on the left rear portion 31L, to sew up together. Thus, other third stitch portions 161, 161, . . . (not shown) are formed by sewing the third guide marks 16, 16, . . . of the front fabric panel 20 and the left panel 31L. It should be noted that this embodiment is explained that the tether portion 11 is sewn to the right rear portion 31R or the left rear portion 31L by forming the first stitch portions 141, 141 . . . before sewing the front fabric panel 10 and the right rear portion 31R or the front fabric panel 20 and the left rear portion 31L by forming the third stitch portions (peripheral stitch portion) 161, 161, . . . , for illustration. Thus, the airbag cushion may be manufactured by reverse processing. In other words, after sewing the front fabric panel 10 and the right rear portion 31R or the front fabric panel 20 and the left rear portion 31L by forming the third stitch portions (peripheral stitch portion) 161, 161, . . . , the tether portion 11 may be sewn to the right rear portion 31R or the left rear portion 31L by forming the first stitch portions 141, 141 . . . , and then the inflator connection portion 32 may be sewn to the fourth stitch portions 341, 341, . . . . In short, the sequence of the sewing process may be modified as desired, according to the manufacturing condition.

Figure 6:
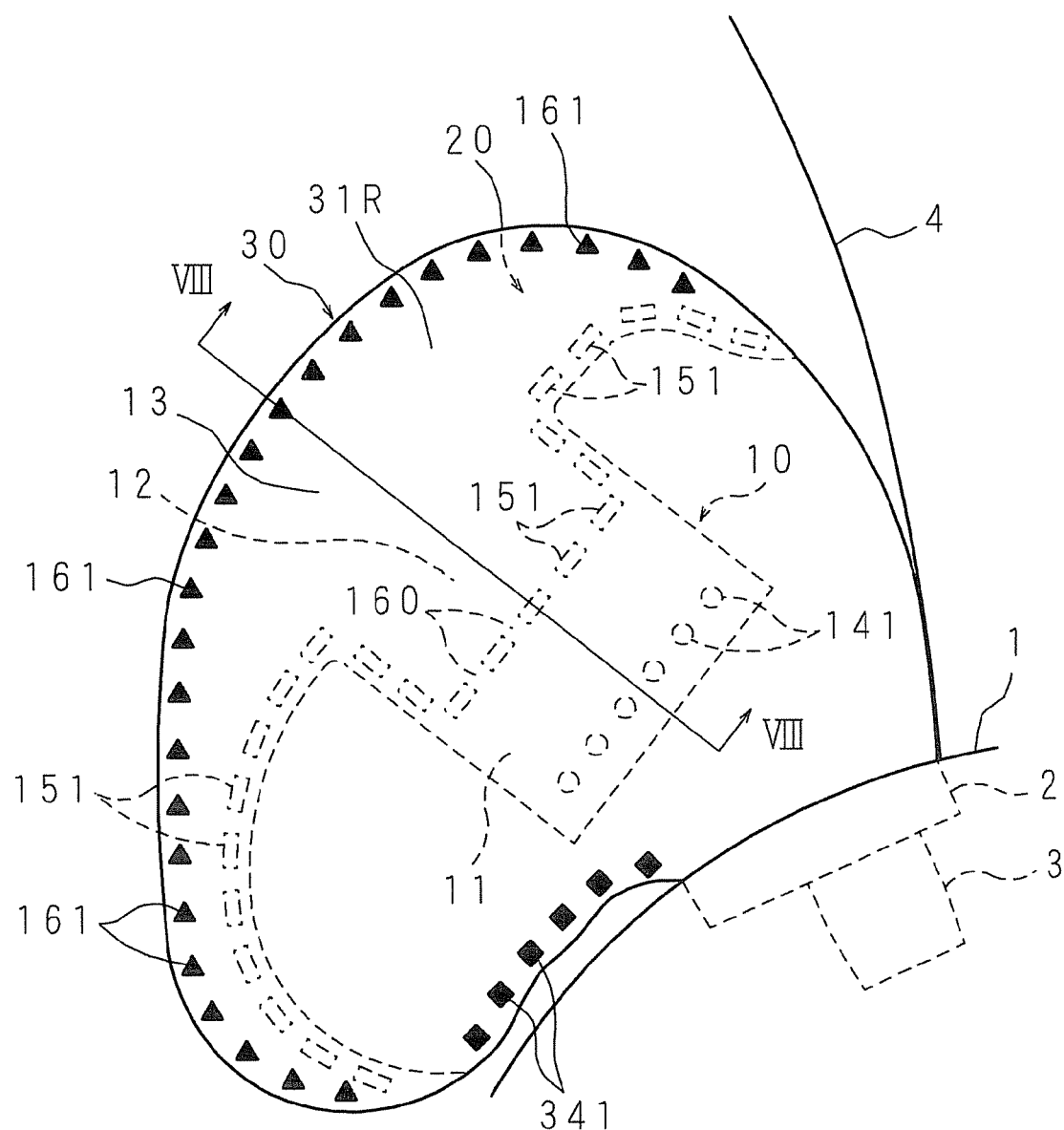
FIG. 6 is a schematic side view showing an airbag cushion that is equipped in an instrumental panel on an assistant driver side while being inflated and deployed.
Figure 7:
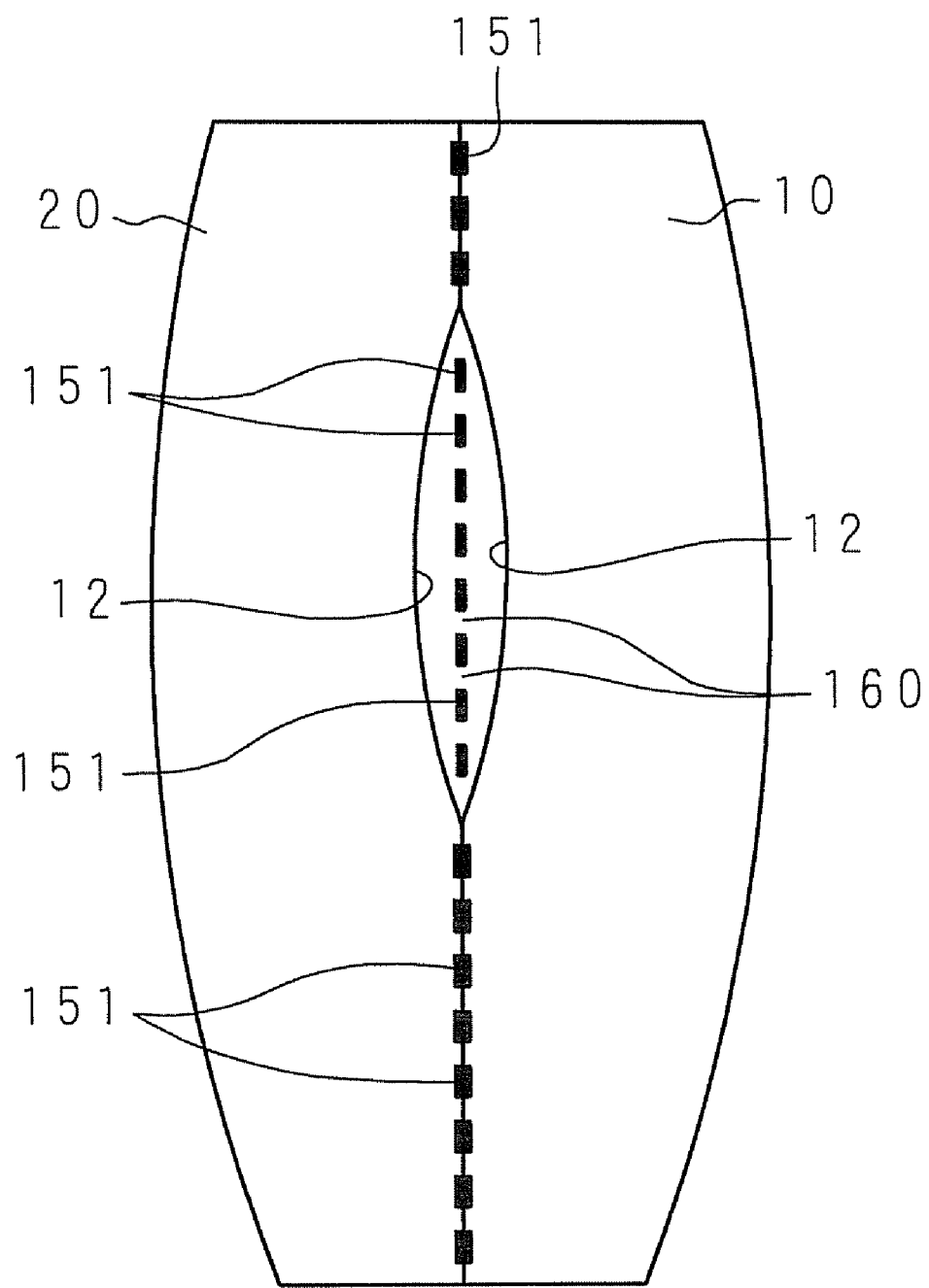
FIG. 7 is a schematic front view showing the airbag cushion inflated and deployed.
Figure 8:
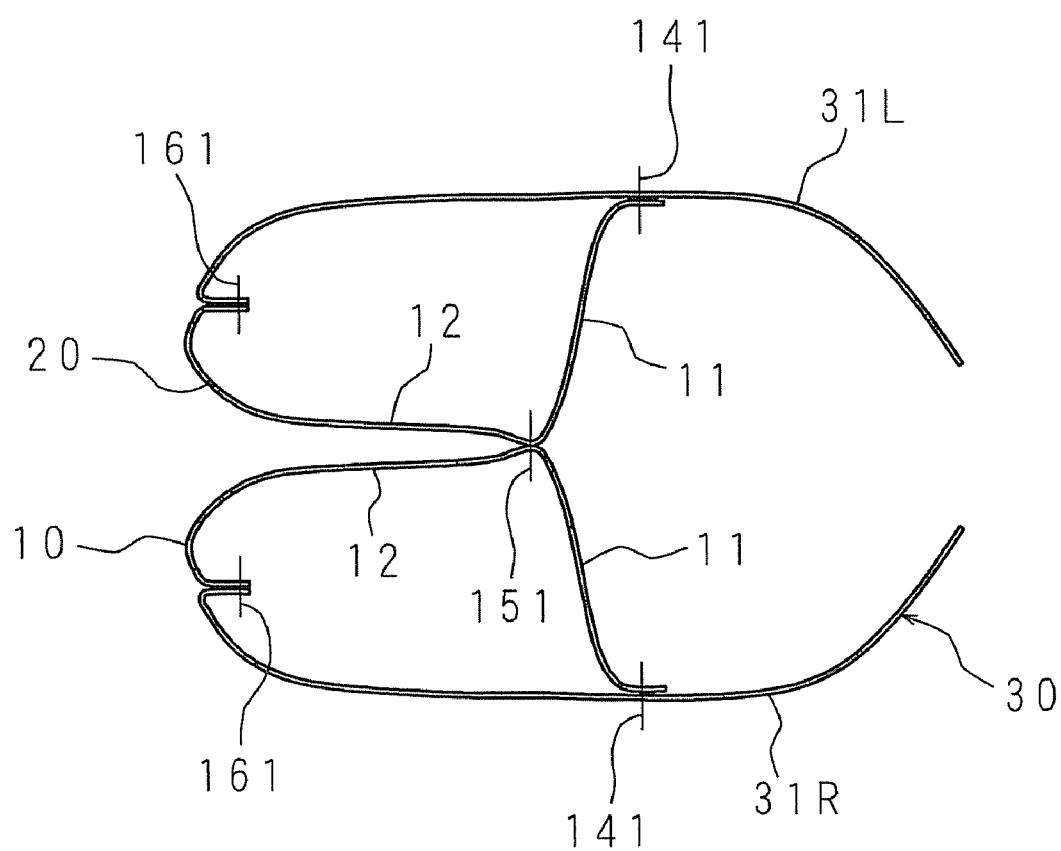
FIG. 8 is a schematic cross-sectional view taken along a line VIII-VIII in FIG. 6.

FIG. 6 is a schematic side view showing the airbag cushion equipped in the instrumental panel on an assistant driver side, in a deployed state; FIG. 7 is a schematic front view showing the airbag cushion in the deployed state; and FIG. 8 is a schematic cross-sectional view taken along a line VIII-VIII in FIG. 6. The airbag cushion, which is manufactured through the sewing processing described above, is folded in a predetermined shape and stored in an airbag cushion case 2. A gas supply pipe (not shown) of an inflator 3 is inserted to the inflator inlet 33 shown in FIG. 5. The inflator 3 and the airbag cushion case 2 are equipped inside the instrumental panel 1 on the assistant driver side. In the case of inflating and deploying the airbag cushion because of collision or the like, the gas is supplied through the gas supply pipe (not shown) of the inflator 3, and then the supplied gas is injected into the airbag cushion through the inflator inlet 33. It should be noted that the inflator inlet 33 and the inflator connection portion 32 are not shown in FIG. 6 for abbreviation.

The airbag cushion is inflated and deployed along the instrumental panel 1 and a front glass 4. The injected gas is loaded into a space defined by three stitch portions on the right rear portion 31R and the front fabric panel 10: the second stitch portions 151, 151, . . . formed to make a recessed shape, the first stitch portions 141, 141, . . . formed in the arc-shapes, and the fourth stitch portions 341, 341, . . . . In the similar manner, the injected gas is loaded into a space defined by three stitch portions on the left rear portion 31L and the front fabric panel 20: the second stitch portions 151, 151, . . . formed to make a recessed shape, the first stitch portions 141, 141, . . . formed in the arc-shapes, and the fourth stitch portions 341, 341, . . . .

Accordingly, as shown in FIG. 7, the airbag cushion is inflated and deployed with symmetry of the pattern, while directing the front fabric panel 10 and the front fabric panel 20 toward the occupant. Since the front fabric panel 10 and the front fabric panel 20 are sewn together via the second stitch portions 151, 151, . . . , the airbag cushion is prevented the front fabric panel 10 from moving away from the front fabric panel 20. In addition, the second stitch portions 151, 151, . . . are formed to make a recessed shape in side view. Accordingly, a recessed bag is formed with the intermediate portions 12, 12, while having the back end 160 of the tether portion 11 as the end face. At the moment of inflation/deployment, the front fabric panel 10 and the front fabric panel 20 contact the shoulders or the costae of the occupant to absorb the impact. Moreover, the recessed bag catches the head or the chest to absorb the impact properly. The tether portion 11 configures a part of the front fabric panel 10. In other words, the tether portion 11 is a part of the front fabric panel 10. Therefore, it is possible to manufacture the airbag cushion through a simplified processing, because of sewing the front end of the tether portion 11 to the rear fabric panel.

While the tether portions 11, 11 project from the front fabric panel 10 and the front fabric panel 20 away from the third stitch portions 161, 161, . . . , each one side (front end) of the tether portions 11, 11 is sewn at first stitch portions 141, 141, . . . on an inner face of the left rear portion 31L or on an inner face of the right rear portion 31R, as shown in FIGS. 6 and 8. Accordingly, it is possible to limit a spacing between the front fabric panel 10 and the right rear portion 31R, as well as a spacing between the front fabric panel 20 and the left rear portion 31L, within bounds corresponding to a spacing between the one side (front end) of the tether portion 11 defined by the first stitch portions 141, 141, . . . and the back end 160 on the other side of the tether portion 11 defined by the second stitch portions 151, 151, . . . , at the moment of the inflation/deployment of the airbag cushion.

It should be noted that this embodiment is explained to equip the airbag cushion inside the instrumental panel 1 on the assistant driver side, for illustration. For example, the airbag cushion may be equipped inside a steering wheel on a driver side, a back side of a front seat to protect an occupant on a rear seat, or a handle component of a motorcycle. Furthermore, it should be noted that this embodiment is explained to manufacture the airbag cushion with the rear fabric panel 30, the front fabric panel 10, the front fabric panel 20 and two tether portions 11, 11, for illustration. An additional fabric panel may be utilized to manufacture the airbag cushion as appropriate.

Second Embodiment

Figure 9:
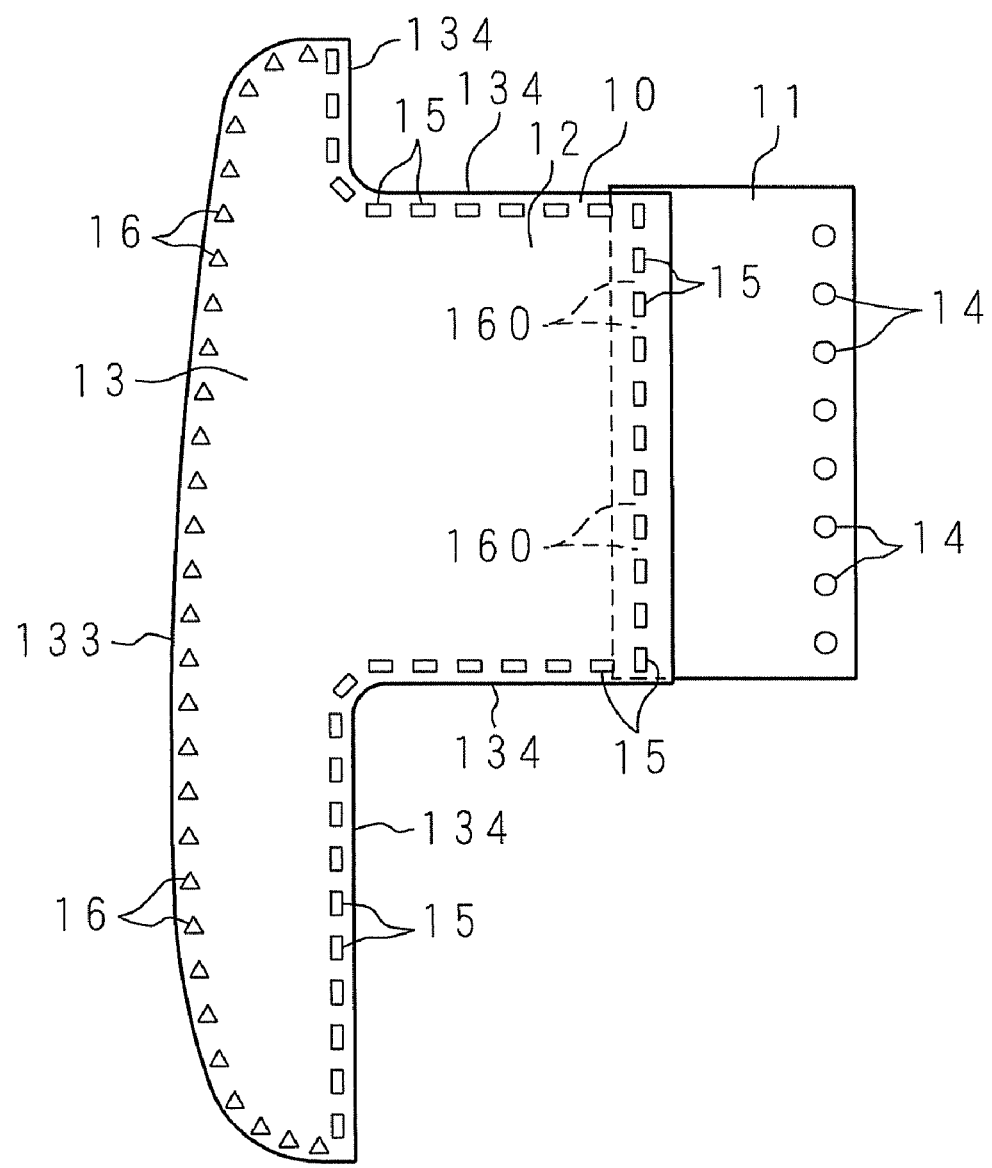
FIG. 9 is a plan view showing a shape of a front fabric panel and a tether portion according to a second embodiment.

The first embodiment is explained to have the tether portion 11 that is a part of the front fabric panel 10. However, the tether portion 11 may be a separate structure from the front fabric panel 10. FIG. 9 is a plan view showing a shape of the front fabric panel 10 and the tether portion 11 according to a second embodiment. The front fabric panel 10 of the second embodiment is shorter than the front fabric panel 10 of the first embodiment by a size corresponding to the tether portion 11, because the tether portion 11 of the second embodiment is a separate structure from the front fabric panel 10. The tether portion 11 is formed in a rectangular shape, and made of the same material as that of the front fabric panel 10 or a composite material containing an elastic material such as a polyurethane fiber. On the tether portion 11, the front fabric panel 10 is placed to arrange the back end 160 of the tether portion 11 under the second guide marks 15 of the front fabric panel 10. A configuration for the front fabric panel 20 is similar to the configuration for the front fabric panel 10 and, accordingly, will not be described in detail.

Figure 10:
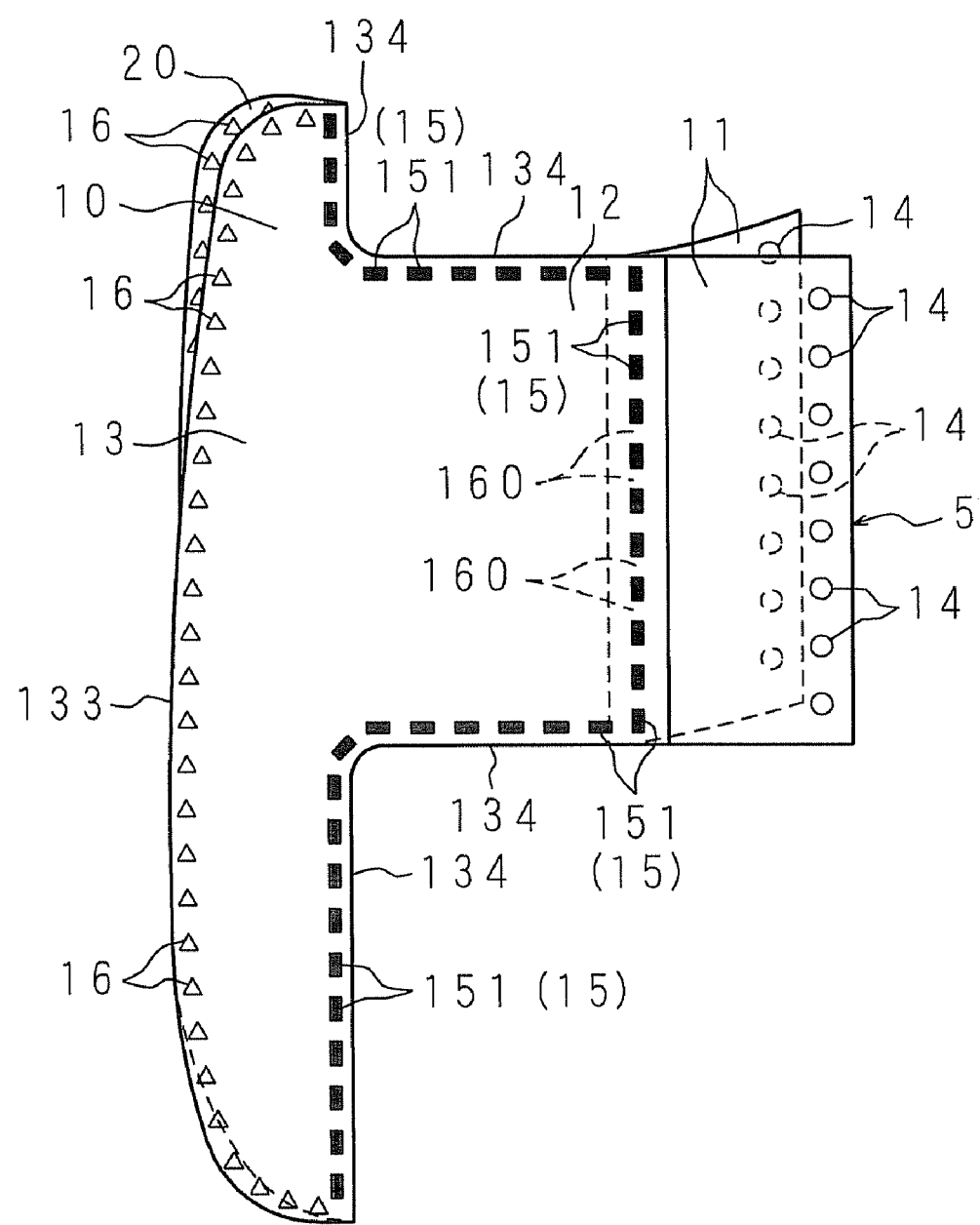
FIG. 10 is a plan view showing front fabric panels, tether portions and a state where the front fabric panels and the tether portions are sewn together.

FIG. 10 is a plan view showing a state where the front fabric panel 10 and the tether portion 11, as well as the front fabric panel 20 and the tether portion 11, are sewn up together. The tether portions 11, 11 are inserted into a space between the front fabric panel 10 and the front fabric panel 20. Thus, each tether portion 11 partially overlaps the front fabric panel 10 or the front fabric panel 20. The back ends 160, 160 of the tether portions 11, 11 are sewn to the front fabric panels 10, 20 along the second guide marks 15, 15, . . . , after confirming that the back ends 160, 160 of the tether portions 11, 11 are located between the second guide mark 15 of the front fabric panel 10 and the second guide mark 15 of the front fabric panel 20. Thus, the second stitch portions (recessed stitch portion) 151, 151, . . . are formed to make a recessed shape, which are indicated by solid triangles, by sewing the back ends 160, 160 of the tether portions 11, 11 and the front fabric panels 10, 20.

It should be noted that this embodiment is explained to have the tether portion 11 which is vertically long with a rectangular shape, for illustration. The tether portion 11 may be horizontally long with a rectangular shape. It is possible to improve design flexibility for the tether portion 11 which is configured to be a separate structure from the front fabric panel 10. For example, it is possible to modify the material of the tether portion 11 to an elastic material, as appropriate. Furthermore, it is possible to simplify the processing to manufacture the airbag cushion, for sewing together the back ends 160, 160 of the tether portions 11, the front fabric panel 10 and the front fabric panel 20 along the second stitch portions 151, 151, . . . at a time.

Some configurations and advantages of the second embodiment are described above. Other configurations that are the same as those of the first embodiment are given the identical numerals to the first embodiment and, accordingly, those other configurations and other advantages will not described in detail.

Third Embodiment

Figure 11:
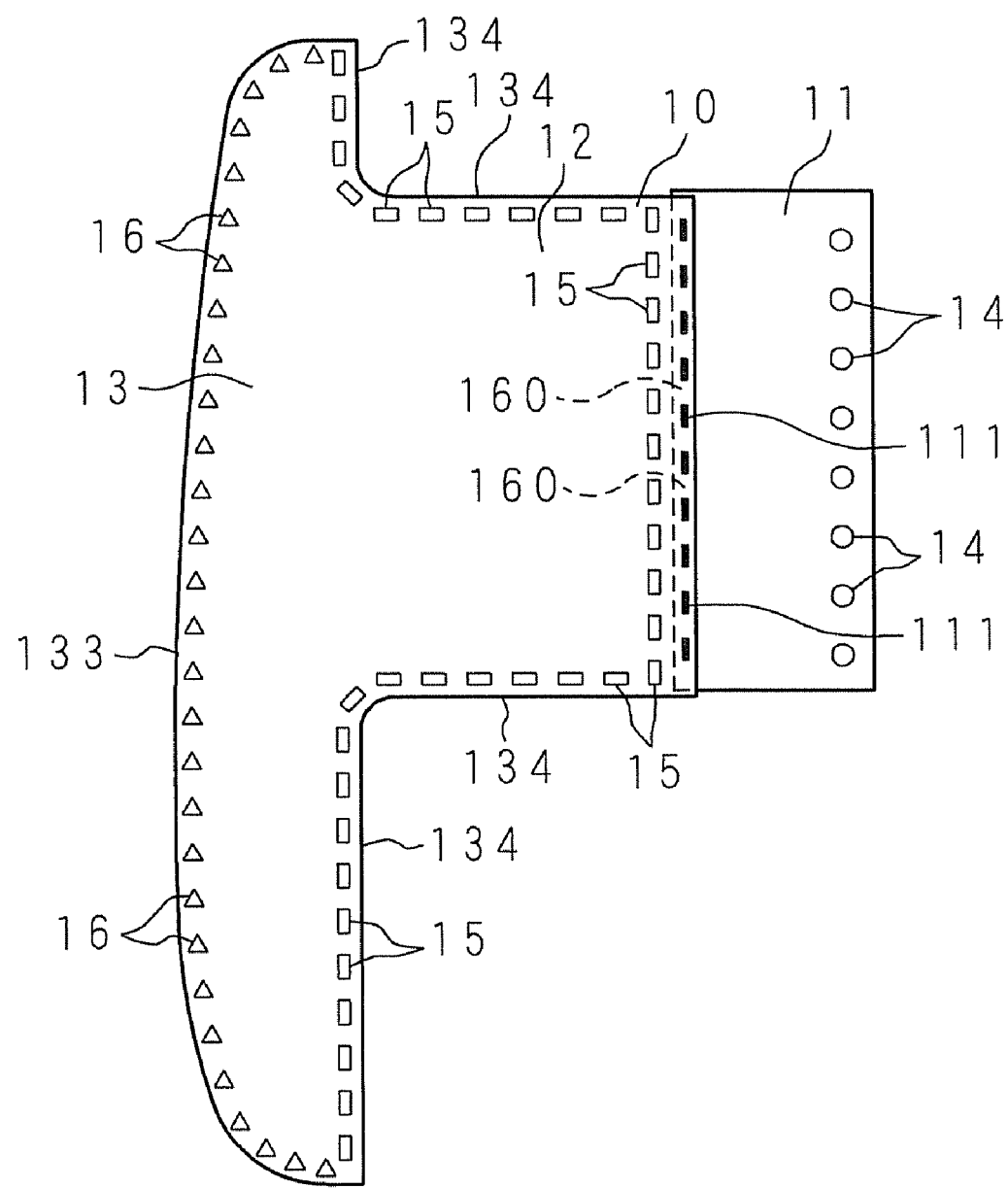
FIG. 11 is a plan view showing a shape of a front fabric panel and a tether portion according to a third embodiment.

According to a third embodiment, the back end portion 160 of the tether portion 11 may be sewn separately from the second stitch portions 151. FIG. 11 is a plan view showing a shape of the front fabric panel 10 and the tether portion 11 according to the third embodiment. The front fabric panel 10 and the tether portion 11 of the third embodiment are formed in the same shapes as those of the second embodiment. The tether portion 11 of the third embodiment is further made of the same material as that of the second embodiment. On the tether portion 11, the front fabric panel 10 is placed to arrange the back end 160 of the tether portion 11 between a front end of the front fabric panel 10 and the second guide marks 15, 15, . . . of the front fabric panel 10. It should be noted that the tether portion 11 may be placed on the front fabric panel 10.

The back end 160 of the tether portion 11 is then sewn to a portion between the front end of the front fabric panel 10 and the second guide marks 15, 15, . . . . Thus, fifth stitch portions 111, 111, . . . are formed by sewing the back end 160 and the front fabric panel 10. Therefore, it is possible to join the back end 160 of the tether portion 11 to the front fabric panel 10 which is a separate structure from the tether portion 11. The front fabric panel 10 and the front fabric panel 20 are then sewn together, as shown with FIG. 3 in the first embodiment, to form second stitch portions (recessed stitch portion) 151, 151, . . . to make a recessed shape. In this configuration, the tether portion 11 projects from a vicinity of the second stitch portions 151, 151, . . . . A configuration for the front fabric panel 20 is similar to the configuration for the front fabric panel 10 and, accordingly, will not be described in detail.

Some configurations and advantages of the third embodiment are described above. Other configurations that are the same as those of the first and second embodiments are given the identical numerals to the first and second embodiments and, accordingly, those other configurations and other advantages will not described in detail.

Fourth Embodiment

Figure 12:
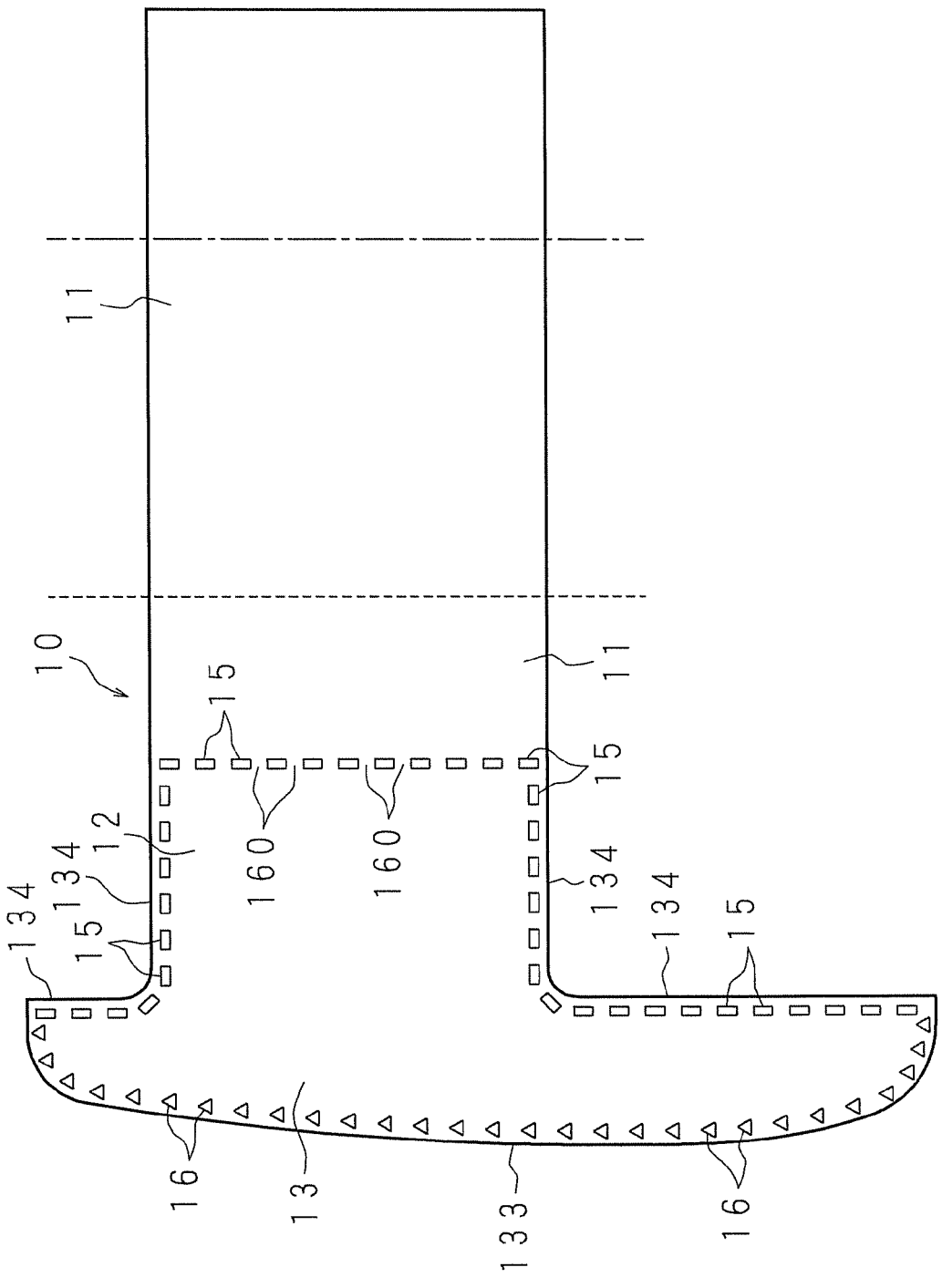
FIG. 12 is a plan view showing a shape of a front fabric panel.

According to a fourth embodiment, the front fabric panel 10, 20 may be cut some portions, in accordance with a design. FIG. 12 is a plan view showing a shape of a front fabric panel. The front fabric panel 10 of the fourth embodiment protrudes longer tether portion 11 than that of the first embodiment. The tether portion 11 is a rectangular shape that projecting direction is longer. In accordance with a design, such as a size, an inflation tolerance, an equipped position of the airbag and the like, the tether portion 11 is cut from a direction crossing to the projecting direction.

The tether portion 11 may be cut from a direction crossing to the projecting direction, for example, at a position indicated by dash line or alternate long and short dash line in FIG. 12. If the tether portion 11 needs to be longer, it is cut from a direction crossing to the projecting direction, at a position indicated by dash line near the head portion 13. If the tether portion 11 needs to be shorter, it is cut from a direction crossing to the projecting direction, at a position indicated by alternate long and short dash line away from the head portion 13. The front fabric panel 20 also has the tether portion 11 cut at a position to lead the same length as the tether portion 11 of the front fabric panel 10, although it is not shown. If the tether portion 11 needs to be further longer, each the front fabric panel 10, 20 protruding the tether portion 11 is utilized without cutting. These configurations allow making each the front fabric panels 10, 20 have the tether portion with suitable length in accordance with a design.

Figure 13:
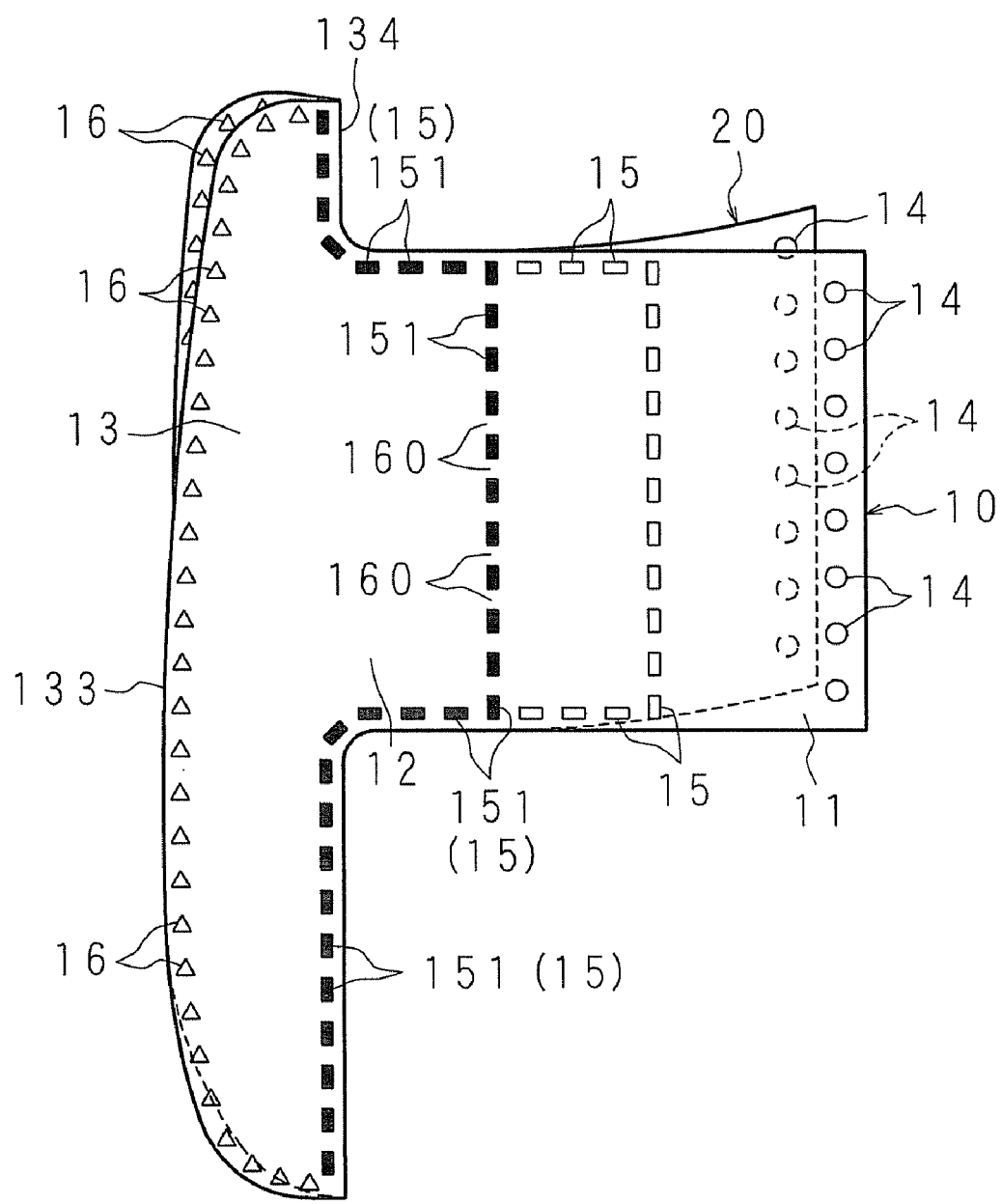
FIG. 13 is a plan view showing a state where two front fabric panels are sewn together.

In addition, a shape of the recessed stitch portion 151 may be changed in accordance with a design. FIG. 13 is a plan view showing a state where two front fabric panels 10, 20 are sewn together. A depth of the recessed portion of the recessed stitch portion 151 also may be changed in accordance with a design. If the tether portion 11 needs to be longer, the recessed stitch portion 151 may be sewn, for example, to have a shallower depth. On the other hand, if the tether portion 11 needs to be shorter, the recessed stitch portion 151 may be sewn, for example, to have a deeper depth.

FIG. 13 is an illustration for the recessed stitch portion 151 having a shallower depth. If the tether portion 11 needs to be longer, the front fabric panel 10 may be sewn to the front fabric panel 20 at a position for shallower depth of the recessed portion, i.e. at a position near the head portion 13, to form a second stitch portion (recessed stitch portion) 151 indicated by solid rectangle shapes. On the other hand, if the tether portion 11 needs to be shorter, the front fabric panel 10 may be sewn to the front fabric panel 20 at a position away from the head portion 13 for deeper depth of the recessed portion, i.e. at the second guide marks 15 indicated void rectangular shapes in FIG. 13. These configurations allow making each the front fabric panels 10, 20 have the tether portion with suitable length in accordance with a design.

Some configurations and advantages of the forth embodiment are described above. Other configurations that are the same as those of the first, second and third embodiments are given the identical numerals to the first, second and third embodiments and, accordingly, those other configurations and other advantages will not described in detail.

Fifth Embodiment

Figure 14:
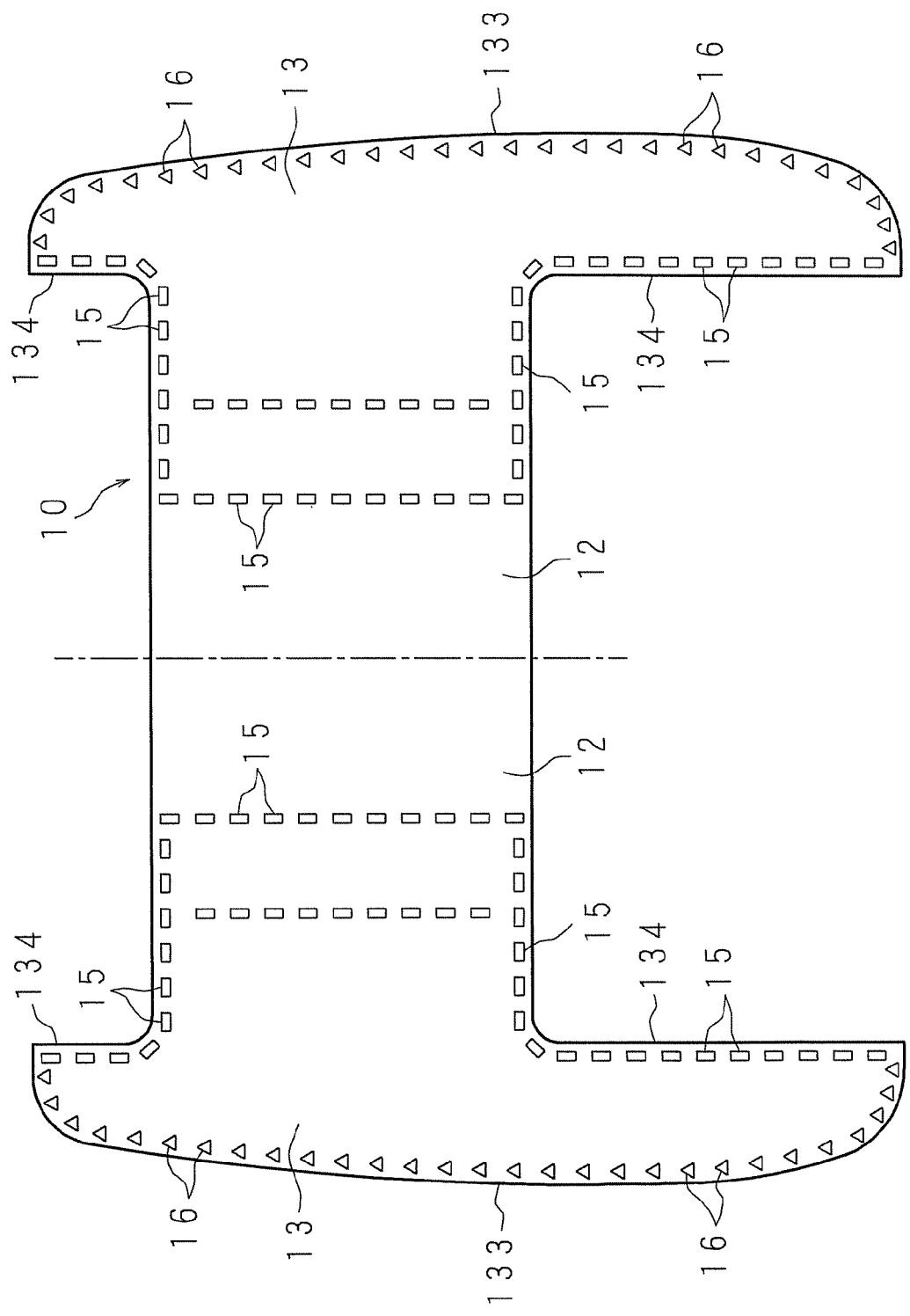
FIG. 14 is a plan view showing a shape of a front fabric panel according to a fifth embodiment.

According to a fifth embodiment, the airbag has one front fabric panel 10. FIG. 14 is a plan view showing a shape of a front fabric panel according to the fifth embodiment. The front fabric panel 10 includes two head portions 13, 13 and two intermediate portions 12, 12 joining respectively to the two head portions 13, 13. The front fabric panel 10 is a symmetrical shape relative to a substantial center in the longitudinal direction indicated by alternate long and short dash line. The intermediate portion 12 is joined to the head portion 13, at upper position than a center position of the substantial semi-elliptic-shaped head portion 13. A periphery of the head portion 13 joined to the intermediate portion 12 includes the arc-shaped peripheral portions 133, 133, . . . that are sewn to a periphery of the rear fabric panel and the substantial L-shaped peripheral portions 134, 134, . . . that are sewn together after folding the front fabric panel 10 along a position indicated by alternate long and short dash line.

The front panel 10 is printed the second guide marks 15, 15, . . . indicated by alternate long and short dash line, at some portions. The second guide marks 15, 15, . . . are used to sew after superimposing each the head portions 13, 13 and each the intermediate portions 12, 12 in a proper alignment by folding. For example, the second guide marks 15, 15, . . . are printed along the periphery of the front fabric panel 10, as shown by void rectangle shapes. The second guide marks 15, 15, . . . are printed at the intermediate portion 12 of the front fabric panel 10, in a vertical direction crossing to the longitudinal direction of the front fabric panel 10, too. To adjust the depth of the recessed portion, the front panel 10 may be printed plural lines of the second guide marks 15, 15, . . . extending in the vertical direction crossing to the longitudinal direction. It should be noted that this embodiment is explained to have two lines of the second guide marks 15, 15, . . . extending in the vertical direction crossing to the longitudinal direction, for illustration.

If the recessed depth should be shallower, the front fabric panel 10 may be sewn along the second guide marks 15 near the head portion 13 to form the recessed shape. On the other hand, if the recessed depth should be deeper, the front fabric panel 10 may be sewn along the second guide marks 15 away from the head portion 13, near the center, to form the recessed shape. Along the arc-shaped peripheral portion 133 of the head portion 13, the front fabric panel 10 is printed the third guide marks 16, 16, . . . that are indicated by void triangle shapes. The third guide marks 16, 16, . . . are used to sew the rear fabric panel 30 and the arc-shaped peripheral portions 133, 133 of the front fabric panel 10 in a proper alignment.

Figure 15:
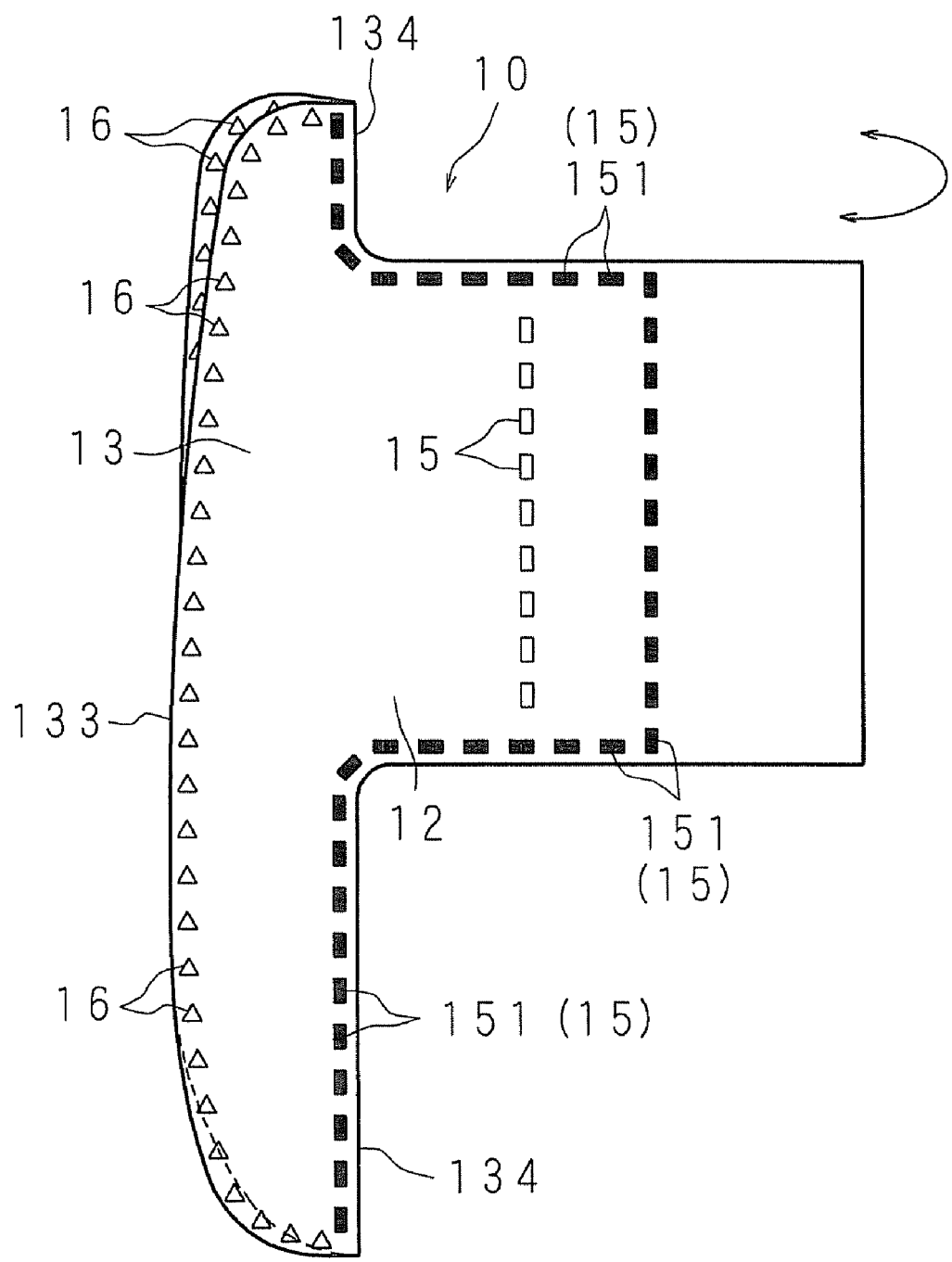
FIG. 15 is a plan view showing a state where the front fabric panel is sewn.

FIG. 15 is a plan view showing a state where the front fabric panel is sewn. The front fabric panel 10 is folded along the alternate long and short dash line. Respective head portions 13, 13, as well as respective intermediate portions 12, 12, are properly superimposed. Then, the front fabric panel 10 is sewn along one of the lines of the second guide mark 15 to form a second stitch portion (recessed stitch portion) 151 in a recessed shape. In FIG. 15, the front fabric panel 10 is sewn along the second guide mark 15 positioned away from the head portion 13, to make the recessed depth deeper.

Figure 16:
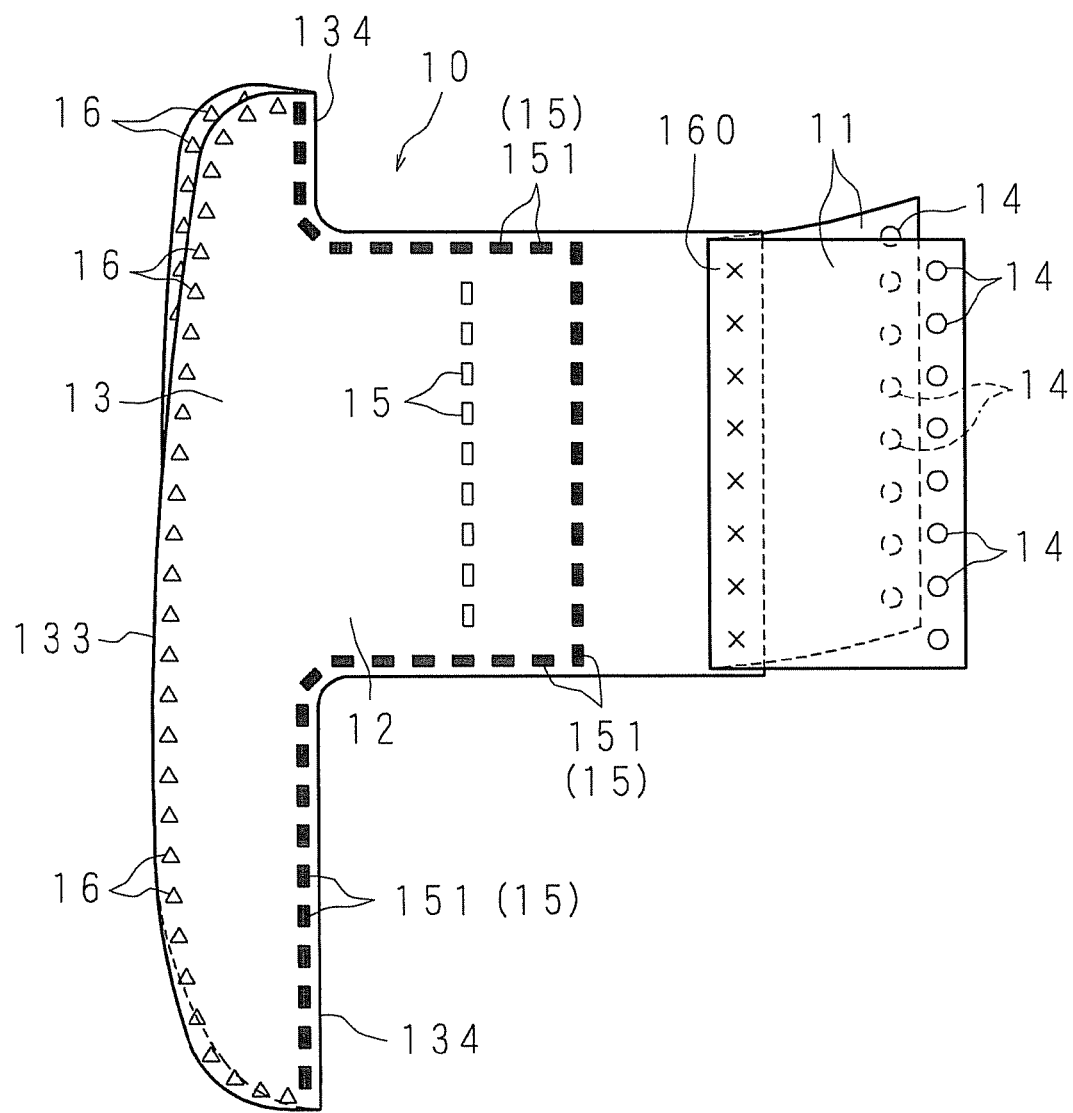
FIG. 16 is a plan view showing a state where the front fabric panel and the tether portion are sewn together.

FIG. 16 is a plan view showing a state where the front fabric panel and the tether portion 11 are sewn together. The back end 160 of the tether portion 11 is sewn to a portion of the front panel 10 for folding. This embodiment is explained to have the tether portion 11 that is configured from two rectangular tether portions 11, 11, for illustration. It should be noted that one rectangular tether portion may be utilized, for example, to fold the substantial center and to be sewn the folded portion as the back end 160 to a portion of the front fabric panel 10, in the same manner as the front fabric panel 10.

One back end 160 of the tether portion 11 is put on the one surface of the front fabric panel 10, and the other back end 160 of the tether portion 11 is put on the reverse surface of the front fabric panel 10. Firstly, the one back end 160 of the tether portion 11 is then sewn. Secondly, the one surface and reverse surface of the front fabric are sewn. Finally, the other back end 160 of the tether portion 11 is sewn. Therefore, it is configured a sewn component from the front fabric panel 10 and the tether portion 11. How to sew the sewn component to the rear panel 30 is in the same manner as that of the first embodiment and, accordingly, will not have been described in detail.

Some configurations and advantages of the fifth embodiment are described above. Other configurations that are the same as those of the first, second, third and forth embodiments are given the identical numerals to the first, second, third and forth embodiments and, accordingly, those other configurations and other advantages will not described in detail. The embodiments of the manufacturing method of airbag cushion and the airbag cushion described herein are only preferred illustrations of the present invention. Thus, various modifications may be made thereto. Unless otherwise specified to have restrictions in the description, the present invention is not limited and restricted by the shape, the size, the arrangement and the like of the figures. In addition, phrases and terms in the description are utilized for illustration. Thus, unless otherwise specified to have restrictions in the description, the present invention is not limited and restricted by the phrases and terms.

As this invention may be embodied in several forms wihout departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A manufacturing method of an airbag cushion, comprising steps of:
   superimposing a first front fabric panel of the airbag cushion on a second front fabric panel of the airbag cushion, wherein the first front fabric panel protrudes a first tether portion and the second front fabric panel protrudes a second tether portion;
   sewing a part of a periphery of the superimposed first and second front fabric panels;
   sewing a back end of the first tether portion and a back end of the second tether portion together;
   sewing a front end of the first tether portion to an inner face of a rear fabric panel of the airbag cushion;
   sewing a front end of the second tether portion to an inner face of the rear fabric panel;
   sewing a periphery of the rear fabric panel to a periphery of the first front fabric panel; and
   sewing a periphery of the rear fabric panel to a periphery of the second front fabric panel.

2. A manufacturing method of an airbag cushion according to claim 1, further comprising steps of:
   sewing a part of the first front fabric panel to the back end of the first tether portion; and
   sewing a part of the second front fabric panel to the back end of the second tether portion.

3. A manufacturing method of an airbag cushion according to claim 1, further comprising a step of:
   superimposing the back end of the first tether portion, the back end of the second tether portion, and a part of the superimposed first and second front fabric panels.

4. A manufacturing method of an airbag cushion according to claim 1, wherein
   the first tether portion is a part of the first front fabric panel; and
   the second tether portion is a part of the second front fabric panel.

5. A manufacturing method of an airbag cushion according to claim 1, further comprising steps of:
   cutting an end of the first front fabric panel; and
   cutting an end of the second front fabric panel.

6. A manufacturing method of an airbag cushion according to claim 1, further comprising a step of:
   adjusting a depth of a recessed portion formed by sewing the back end of the first tether portion, the back end of the second tether portion, and the part of a periphery of the superimposed first and second front fabric panels.

7. An airbag cushion, comprising:
   a first front fabric panel;
   a second front fabric panel;
   a rear fabric panel;
   a recessed stitch portion where the first front fabric panel is sewn to the second front fabric panel;
   a peripheral stitch portion where a periphery of the first front fabric panel, a periphery of the second front fabric panel, and a periphery of the rear fabric panel are sewn;

a first tether portion that joins the recessed stitch portion to an inner face of the rear fabric panel; and
a second tether portion that joins the recessed stitch portion to an inner face of the rear fabric panel.

8. An airbag cushion according to claim 7, wherein
the first front fabric panel and the second front fabric panel are parts of one front fabric panel; and
the recessed stitch portion is formed by folding the one front fabric panel.

9. An airbag cushion according to claim 7, wherein
the recessed stitch portion is formed in a recessed shape by sewing.

10. An airbag cushion according to claim 7, wherein
a front end of the first tether portion is sewn to the inner face of the rear fabric panel and a back end of the first tether portion is sewn to the first front fabric panel; and
a front end of the second tether portion is sewn to the inner face of the rear fabric panel and a back end of the second tether portion is sewn to the second front fabric panel.

11. An airbag cushion according to claim 7, wherein
the first tether portion is a part of the first front fabric panel and projects from the recessed stitch portion;
the second tether portion is a part of the second front fabric panel and projects from the recessed stitch portion; and
the recessed stitch portion is positioned at a back end of the first tether portion and at a back end of the second tether portion.

12. An airbag cushion according to claim 7, wherein
the first tether portion is a separate structure from the first front fabric panel and arranged to project from the recessed stitch portion; and
the second tether portion is a separate structure from the second front fabric panel and arranged to project from the recessed stitch portion.

13. An airbag cushion according to claim 7, wherein
the first tether portion is a separate structure from the first front fabric panel and arranged to project from a vicinity of the recessed stitch portion; and
the second tether portion is a separate structure from the second front fabric panel and arranged to project from a vicinity of the recessed stitch portion.

14. An airbag cushion according to claim 7, wherein
the recessed stitch portion is sewn on a back end of the first tether portion, on a back end of the second tether portion, on a part of periphery of the first front fabric panel with a exception of the peripheral stitch portion, and on a part of periphery of the second front fabric panel with a exception of the peripheral stitch portion.

15. An airbag cushion according to claim 8, wherein
the recessed stitch portion is sewn on a back end of the first tether portion, on a back end of the second tether portion, on a part of periphery of the first front fabric panel with a exception of the peripheral stitch portion, and on a part of periphery of the second front fabric panel with a exception of the peripheral stitch portion.

16. An airbag cushion according to claim 9, wherein
the recessed stitch portion is sewn on a back end of the first tether portion, on a back end of the second tether portion, on a part of periphery of the first front fabric panel with a exception of the peripheral stitch portion, and on a part of periphery of the second front fabric panel with a exception of the peripheral stitch portion.

17. An airbag cushion according to claim 10, wherein
the recessed stitch portion is sewn on a back end of the first tether portion, on a back end of the second tether portion, on a part of periphery of the first front fabric panel with a exception of the peripheral stitch portion, and on a part of periphery of the second front fabric panel with a exception of the peripheral stitch portion.

18. An airbag cushion according to claim 11, wherein
the recessed stitch portion is sewn on a back end of the first tether portion, on a back end of the second tether portion, on a part of periphery of the first front fabric panel with a exception of the peripheral stitch portion, and on a part of periphery of the second front fabric panel with a exception of the peripheral stitch portion.

19. An airbag cushion according to claim 12, wherein
the recessed stitch portion is sewn on a back end of the first tether portion, on a back end of the second tether portion, on a part of periphery of the first front fabric panel with a exception of the peripheral stitch portion, and on a part of periphery of the second front fabric panel with a exception of the peripheral stitch portion.

20. An airbag cushion according to claim 13, wherein
the recessed stitch portion is sewn on a back end of the first tether portion, on a back end of the second tether portion, on a part of periphery of the first front fabric panel with a exception of the peripheral stitch portion, and on a part of periphery of the second front fabric panel with a exception of the peripheral stitch portion.

* * * * *